United States Patent
Kawamoto et al.

(10) Patent No.: US 7,972,231 B2
(45) Date of Patent: Jul. 5, 2011

(54) PULLEY ASSEMBLY

(75) Inventors: Shigeru Kawamoto, Ohtsu-chi (JP);
Takeo Shimizu, Kyoto (JP); Tomokazu Ishida, Kobe (JP)

(73) Assignee: Mitsuboshi Belting Ltd. (JP)

( * ) Notice: Subject to any disclaimer, the term of this patent is extended or adjusted under 35 U.S.C. 154(b) by 984 days.

(21) Appl. No.: 11/293,521

(22) Filed: Dec. 2, 2005

(65) Prior Publication Data

US 2007/0254756 A1  Nov. 1, 2007

(30) Foreign Application Priority Data

| Dec. 2, 2004 | (JP) | 2004-349401 |
| Jun. 14, 2005 | (JP) | 2005-174143 |
| Aug. 22, 2005 | (JP) | 2005-239323 |
| Sep. 26, 2005 | (JP) | 2005-277067 |
| Oct. 19, 2005 | (JP) | 2005-304242 |

(51) Int. Cl.
*F16F 15/121* (2006.01)
*F16H 55/36* (2006.01)

(52) U.S. Cl. ......... 474/70; 474/135; 267/179; 464/57

(58) Field of Classification Search ......... 464/61.1, 464/464, 57–60; 474/69, 70, 74, 135; 267/155, 267/179; *F16H 9/00; F16F 15/121*
See application file for complete search history.

(56) References Cited

U.S. PATENT DOCUMENTS

| 1,047,491 | A | * | 12/1912 | Bliss | 267/74 |
| 1,331,090 | A | * | 2/1920 | Bijur | 290/31 |
| 4,696,663 | A | * | 9/1987 | Thomey et al. | 474/133 |
| 4,723,934 | A | * | 2/1988 | Thomey | 474/135 |
| 5,139,463 | A | | 8/1992 | Byzek et al. | |
| 5,156,573 | A | * | 10/1992 | Bytzek et al. | 474/74 |
| 5,964,674 | A | * | 10/1999 | Serkh et al. | 474/109 |
| 6,083,130 | A | * | 7/2000 | Mevissen et al. | 474/70 |
| 2002/0177499 | A1 | * | 11/2002 | Ayukawa et al. | 474/135 |
| 2004/0014540 | A1 | * | 1/2004 | Dell et al. | 474/70 |
| 2004/0104090 | A1 | * | 6/2004 | Jansen et al. | 192/41 S |
| 2005/0250607 | A1 | * | 11/2005 | Jansen et al. | 474/74 |

FOREIGN PATENT DOCUMENTS

JP  08-240246  9/1996

* cited by examiner

*Primary Examiner* — David D Le
*Assistant Examiner* — Terry Chau
(74) *Attorney, Agent, or Firm* — Wood, Phillips, Katz, Clark & Mortimer

(57) ABSTRACT

A pulley assembly having first and second members. The first member is capable of cooperating with a power transmission belt to drive/be driven by the belt. The first member is movable guidingly relative to the second member around a first axis. A coil spring has a length and a circumference and a first portion attached to the first member and a second portion attached to the second member so that a force tending to move the first/second member around the first axis is transmitted through the coil spring to the second/first member. At least one of the first and second members has a groove bounded by a surface into which the respective portion of the coil spring is fit. The respective portion of the coil spring is clamp fit within the groove.

29 Claims, 21 Drawing Sheets

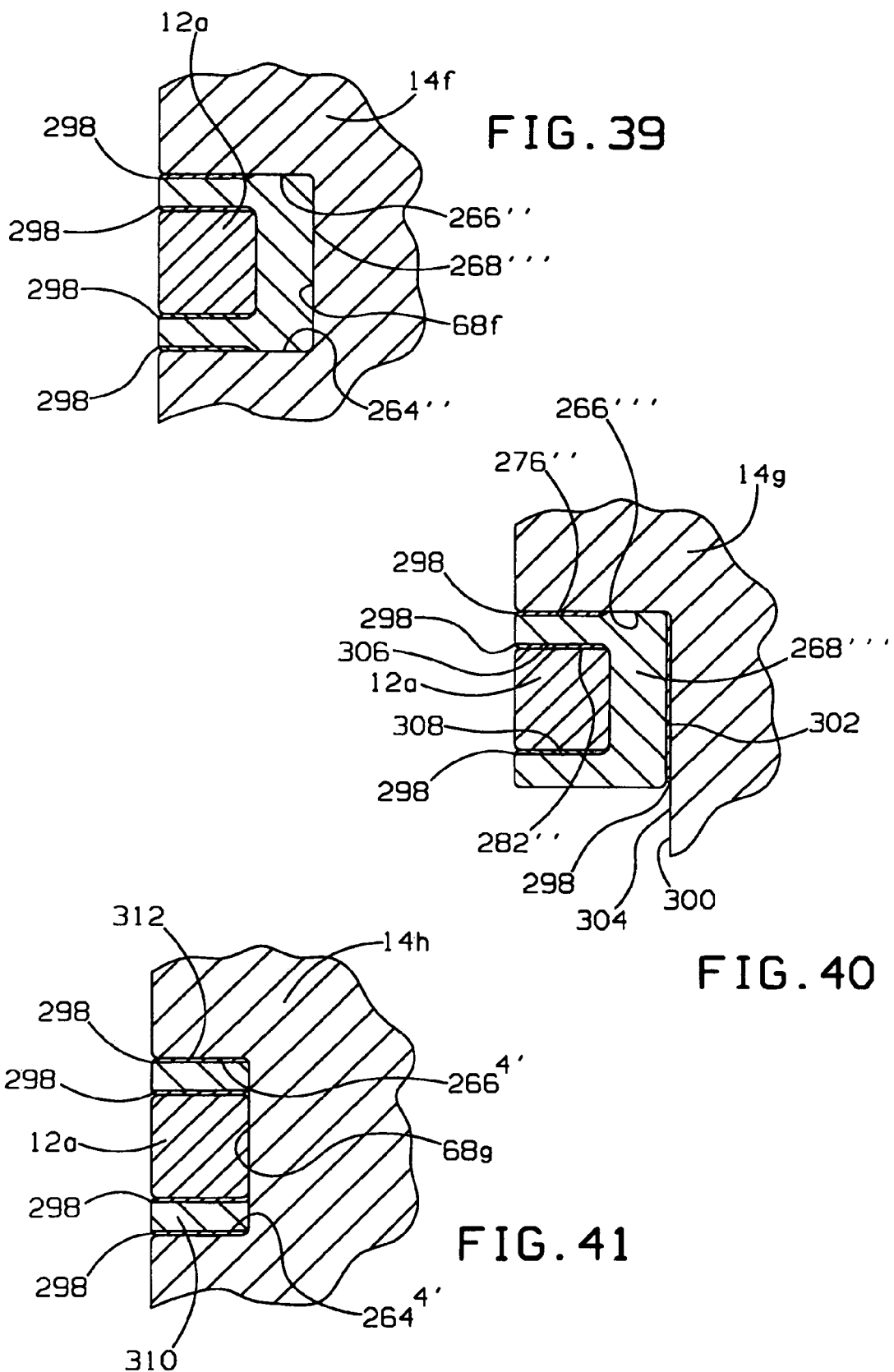

PULLEY ASSEMBLY

BACKGROUND OF THE INVENTION

1. Field of the Invention

This invention relates to apparatus of the type having separate members that are movable guidingly relative to each other around a rotational axis and, more particularly, to such an apparatus in which a coil spring interconnects between the separate members so as to transmit rotational forces therebetween.

2. Background Art

In automobile engines, it is well known to provide an alternator that is driven by the engine crankshaft to generate power. However, due to the nature of internal combustion engines, the crankshaft rotation will fluctuate, as a result of which there are recurring and momentary increases and decreases in rotational speed.

The power generating shaft of the alternator has a large moment of inertia. Typically, an endless power transmission belt transmits power from the engine crankshaft to a pulley on the alternator shaft. With this type of system, slippage commonly occurs between the pulley and belt each time the speed of the belt changes by reason of fluctuations in the rotational speed of the engine crankshaft. This condition can cause noise as the belt slips with respect to the pulley.

A further problem resulting from fluctuations in the crankshaft speed is that a corresponding fluctuation in the alternator shaft may adversely affect power generation capability, thereby resulting in a reduction in power generation efficiency.

It is known to absorb these system fluctuations by elastically connecting the alternator shaft to the associated pulley. Through this arrangement, fluctuations may be absorbed without slippage occurring between the belt and pulley on the alternator shaft. It is known to incorporate an elastic member and/or a viscous fluid between the pulley and a shaft relative to which the pulley rotates on the alternator.

One example of such a hybrid system is disclosed in JP 08-240246 A. In this system, a rubber elastic member is interposed between the pulley and a separate member relative to which the pulley is rotated. A viscous fluid is also utilized, the viscosity of which increases in response to the generation of a shear force resulting from rotational speed fluctuations.

With this construction, even when a torque is applied to the pulley, capable of generating a shearing stress in excess of the elastic limit of the elastic member, a relative angular displacement between the pulley and member is suppressed by reason of an increase in viscosity of the viscous fluid. This avoids damage to the elastic member due to yielding, or breakage.

However, the elastic deformation permissible within the limit of the elasticity of the rubber member may not be such as to permit the desired degree of relative angular displacement between the pulley and the member relative to which it rotates.

Another drawback with this type of system is that the fluctuation in torque resulting from crankshaft rotational speed fluctuations is not easily transmitted to the alternator shaft. At the same time, the belt is subject to resonance due to fluctuation in tension, so that additional noise may be generated and/or the durability of the belt may be adversely affected.

It is also known to use only an elastic member between the pulley and member relative to which the pulley rotates. The elastic member is commonly in the form of a coil spring, the ends of which are fitted in, and fixed with respect to, arcuate grooves provided in each of the pulley and cooperating member. The ends of the coil spring are curved and locked to their respective members. In the regions of the grooves where the coil spring is not fixed, there are normally fixed gaps between the spring and the surfaces bounding the grooves.

With this latter construction, it is possible to allow a relatively large angular displacement between the pulley and cooperating member, whereby it may be possible to reduce fluctuation in the tension of the belt wrapped around the pulley. As a result of this, belt squealing may be suppressed. This system may also account for improved durability of the belt.

U.S. Pat. No. 5,139,463 discloses a pulley used on an alternator cooperating with a serpentine drive mechanism on an automobile engine. The system has a hub that rotates together with an armature assembly and an AC generator pulley mounted on the hub. Between the hub and the AC generator pulley, a coil spring is provided having end portions that are fixed to the hub and pulley. Rotational movement of the AC generator pulley through a serpentine belt is transmitted to the hub. It is also possible to effect relative elastic rotational movement in the opposite direction with respect to the AC generator pulley. The end portions of the coil spring are bent radially outwardly and are accommodated in complementary notches in the hub and AC generator pulley.

By using this type of system, a number of the aforementioned problems associated with the system in JP 08 240246 A are avoided. That is, belt resonance and resulting noise may be avoided. Further, the belt durability problems associated with this prior system are potentially avoided.

However, by reason of increasing the relative angular displacement of the pulley and power generation shaft of the alternator, the coil spring may be prone to failure, for the reasons stated below. At the regions where the coil spring ends are fitted and fixed to their respective members, adjacent to the regions where the above-noted gaps are provided, there are sharp transition corners. That is, the ends of the coil spring are each bent at approximately a right angle at this location. Each time the coil spring undergoes elastic deformation, there is a stress concentration in the vicinity of the corners. As a result, due to the localized stress concentration resulting each time the crankshaft rotational speed fluctuates, there is a danger that the corners on the coil spring ends may fatigue to the point of fracture. As a result, the coil spring may break in a relatively short period of time, as a consequence of which the overall structure may become inoperative.

SUMMARY OF THE INVENTION

In one form, the invention is directed to a pulley assembly having first and second members. The first member is capable of cooperating with a power transmission belt to drive/be driven by the belt. The first member is movable guidingly relative to the second member around a first axis. A coil spring has a length and a circumference and a first portion attached to the first member and a second portion attached to the second member so that a force tending to move the first/second member around the first axis is transmitted through the coil spring to the second/first member. At least one of the first and second members has a groove bounded by a surface into which the respective portion of the coil spring is fit. The respective portion of the coil spring is clamp fit within the groove.

In one form, the groove is arcuate with a curvature extending around the first axis.

The respective portion of the coil spring and groove may be relatively dimensioned so that there is a radial gap between the respective portion of the coil spring and groove surface that increases gradually from zero in a direction from the respective portion of the coil spring towards the other portion of the coil spring.

The respective portion of the coil spring may have a substantially constant curvature around the first axis and extend at the constant curvature to a free end.

In one form, a length of the respective portion of the coil spring, spaced from the free end, is clamp fit within the groove without any radial gap between the respective portion of the coil spring and groove surface.

In one form, the respective portion of the coil spring has a free end and a length of the respective portion of the coil spring spaced from the free end is clamp fit within the groove without any radial gap between the respective portion of the coil spring and groove surface.

In one form, the groove is curved around the first axis and the respective portion of the coil spring is curved around the first axis. The groove and respective portion of the coil spring have different curvatures where the respective portion of the coil spring is clamp fit within the groove.

In one form, the respective portion of the coil spring is clamp fit within the groove by press fitting the respective portion of the coil spring into the groove in an axial direction.

The first and second members may bound a chamber within which the coil spring resides.

In one form, there is at least one discrete recess in the groove surface into which the respective portion of the coil spring can be directed.

The at least one discrete recess may open in a radial direction.

In another form, there are a plurality of discrete recesses in the groove surface into which the respective portion of the coil spring can be directed.

The plurality of discrete recesses may be spaced circumferentially from each other and open in a radial direction.

In one form, the groove surface has a radially facing portion that has an undulating, serpentine shape where the respective portion of the coil spring is clamp fit within the groove.

In one form, the respective portion of the coil spring has a radially facing surface portion that has an undulating serpentine shape where the respective portion of the coil spring is clamp fit within the groove.

The respective portion of the coil spring and groove surface are in contact with each other at a first circumferential location and the radial gap increases from zero to 0.02 to 0.1 mm at a second circumferential location that is spaced circumferentially from the first location by on the order of 5° towards the other portion of the coil spring.

In one form, the groove surface is on a thin-walled portion of the one of the first and second members that flexes in a radial direction under a force applied by the spring.

In one form, the respective portion of the coil spring terminates at a free end that is press fit axially to within the groove.

In one form, the respective portion of the coil spring contacts the groove surface at at least three circumferentially spaced locations where the respective portion of the coil spring is clamp fit within the groove.

In one form, the groove surface has asperities where the respective portion of the coil spring is clamp fit within the groove.

The respective portion of the coil spring may have asperities where the respective portion of the coil spring is clamp fit within the groove.

In one form, there are asperities on the groove surface and the respective portion of the coil spring that engage where the respective portion of the coil spring is clamp fit within the groove.

In one form, the respective portion of the coil spring has a free end and the asperities on the respective portion of the coil spring are adjacent to the free end.

The aforementioned asperities may be in the form of serrations and/or knurling.

In one form, the respective portion of the coil spring has at least one locally widened portion that engages the groove surface where the respective portion of the coil spring is clamp fit within the groove.

The at least one locally widened portion may have a curved, radially facing surface.

The curved surface may be convex.

In one form, the respective portion of the coil spring has a plurality of circumferentially spaced, locally widened portions that engage the groove surface where the respective portion of the coil spring is clamp fit within the groove.

The locally widened portion may be defined by applying a compressive force to the coil spring.

In one form, there is a press fitting margin between the respective portion of the coil spring and the groove surface where the respective portion of the coil spring is clamp fit within the groove, and the press fitting margin is not less than 0.1 mm and not more than 0.5 mm.

The press fitting margin may decrease gradually in a direction from the respective portion of the coil spring towards the other portion of the coil spring.

In one form, where the respective portion of the coil spring is clamp fit within the groove, the press fitting margin ranges from less than 0.1 mm to not less than 0.1 mm.

The groove may have a constant radial width.

The groove may have a constant radial width where the respective portion of the coil spring is clamp fit within the groove.

The respective portion of the coil spring may have an offset end length that extends radially to a free end.

The respective portion of the coil spring may be curved around the first axis and bent to define the offset end length.

The coil spring may have a squared cross-sectional configuration.

In one form, there is a first surface on the first member and a second surface on the second member and the first and second surfaces abut to limit relative movement of the first and second members around the first axis.

The first and second surfaces may face circumferentially with respect to the coil spring.

In one form, a friction member acts between the first and second members.

The friction member may be biased against one of the first and second members.

In one form, a pressure member is carried by, and movable guidingly relative to, one of the first and second members. The pressure member is movable to bear the friction member against the other of the first and second members.

The pressure member may be biased to urge the pressure member against the other of the first and second member.

The pressure member may be guided in axial movement relative to the one of the first and second members.

In one form, a spring holder is provided with one of: a) a radially inwardly facing cylindrical surface outside of the coil spring; and b) a radially outwardly facing surface inside of the coil spring.

The spring holder may be made from a non-metal material.

The groove and respective portion of the coil spring may be curved around the first axis. Asperities may be provided on at least one of the groove surface and respective portion of the coil spring where the respective portion of the coil spring is clamp fit within the groove. The asperities control relative movement between the respective portion of the coil spring and groove surface with the respective portion of the coil spring pressed axially into the groove.

In one form, there are interacting asperities on each of the respective portion of the coil spring and the groove surface.

In one form, one of the first and second members has a radially extending plate within which the groove is formed.

In one form, the coil spring has coils, each with a first radius. The groove surface, where the respective portion of the coil spring is clamp fit, has a first arcuate portion with a second radius. The groove surface has a second arcuate portion. The second arcuate portion at least one of: a) has a radius that is different than the second radius; and b) has a curvature that is opposite to a curvature for the first arcuate portion.

The second radius may be approximately equal to an average of the first radii for the coiled spring coils.

In one form, the respective portion of the coil spring is clamp fit within the groove over a circumferential length, and the circumferential length extends from between 60° and 180° around the first axis.

The radially extending plate may be made from a resin material.

The respective portion of the coil spring may be permanently fixed to one of the first and second members.

The respective portion of the coil spring may be integrally bonded with the resin.

In one form, one of the first and second members has a separate, joined collar defining the groove.

In one form, the one of the first and second members has a base to which the collar is joined and the base has an arcuate receiving groove with the collar located within the receiving groove.

In one form, the collar has a lengthwise extent between first and second ends and radial inner and outer portions between which the respective end of the coil spring resides. The inner and outer portions of the collar have different lengthwise extents at the first end of the collar.

In one form, there is at least one protrusion and one recess, one each on the base and collar, which cooperate to maintain the collar in a desired relationship with the base.

The collar may be fixed to the base by at least one of an adhesive and brazing.

In one form, the respective end of the coil spring and collar may be fixed to each other by at least one of an adhesive and brazing.

The invention is further directed to a pulley assembly having first and second members with the first member capable of cooperating with a power transmission belt to drive/be driven by the cooperating power transmission belt. The first member is movable guidingly relative to the second member around a first axis. The coil spring has a length and a circumference and a first portion attached to the first member and a second portion attached to the second member so that a force tending to move the first/second member around the first axis is transmitted through the coil spring to the second/first member. The respective portion of the coil spring and one of the first and second members are attached to each other by at least one of an adhesive or brazing.

The first and second members may bound a chamber within which the coil spring resides.

The invention is further directed to a pulley assembly having first and second members, with the first member capable of cooperating with a power transmission belt to drive/be driven by the belt. The first member is movable guidingly relative to the second member around a first axis. The coil spring has a length and a circumference and a first portion attached to the first member and a second portion attached to the second member so that a force tending to move the first/second member around the first axis is transmitted through the coil spring to the second/first member. One of the first and second members has an outer peripheral spring retaining surface extending around the first axis. The spring retaining surface has a diameter that tapers over at least a portion of an axial extent of the coil spring. The respective portion of the coil spring surrounds the spring retaining surface and is maintained against the tapered portion of the spring retaining surface by a radial restoring force in the respective portion of the coil spring.

In one form, the respective portion of the coil spring has an inside surface with a first diameter with the coil spring in a relaxed state. The tapered portion of the spring retaining surface has a diameter that is greater than the first diameter. The coil spring must be reconfigured by expanding the diameter of the inside surface to allow the inside surface to surround the tapered portion, as an incident of which the radial restoring force is produced.

In one form, the first and second members bound a chamber within which the coil spring resides.

In one form, the tapered portion of the spring retaining surface is at an angle to the first axis of between 3° and 15°.

The invention is further directed to a pulley assembly having a first member and a second member, with the first member capable of cooperating with a power transmission belt to drive/be driven by the belt. The first member is movable guidingly relative to the second member around a first axis. The coil spring has a length and a circumference and a first portion attached to the first member and a second portion attached to the second member so that a force tending to move the first/second member around the first axis is transmitted through the coil spring to the second/first member. One of the first and second members has an inner peripheral spring retaining surface extending around the first axis. The spring retaining surface has a diameter that tapers over at least a portion of an axial extent of the coil spring. The respective portion of the coil spring resides inside of the spring retaining surface and is maintained against the tapered portion of the spring retaining surface by a radial restoring force in the respective portion of the coil spring.

In one form, the respective portion of the coil spring has an outside surface with a first diameter with the coil spring in a relaxed state. The tapered portion of the spring retaining surface has a diameter that is less than the first diameter. The coil spring must be reconfigured by decreasing the diameter of the outside surface to allow the outside surface to reside within and against the tapered portion of the spring retaining surface, as an incident of which the radial restoring force is produced.

In one form, the first and second members bound a chamber within which the coil spring resides.

In one form, the tapered portion of the spring retaining surface is at an angle to the first axis of between 3° and 15°.

BRIEF DESCRIPTION OF THE DRAWINGS

FIG. 39 is a cross-sectional view of the pulley assembly taken along line 39-39 of FIG. 38;

FIG. 40 is a view as in FIG. 39 wherein an L-shaped receptacle/groove is provided for the collar instead of the U-shaped groove in FIG. 39;

FIG. 41 is a view as in FIGS. 39 and 40 and showing a pair of spacers in place of the collar;

DETAILED DESCRIPTION OF THE DRAWINGS

Figure 1:
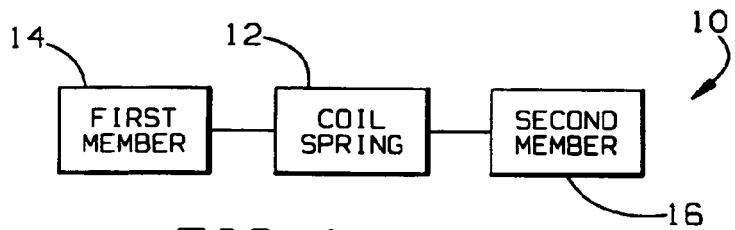
FIG. 1 is a schematic representation of a system, according to the invention, including relatively movable first and second members that are interconnected by a coil spring to transmit forces between the first and second members.

Referring initially to FIG. 1, there is a generic showing of a system 10 according to the present invention. The invention contemplates the use of a coil spring 12 acting between any first and second members 14,16, that are guidingly movable, one relative to the other around an axis. In the system 10, the coil spring 12 transmits rotational forces between the first and second members 14,16.

Figure 2:
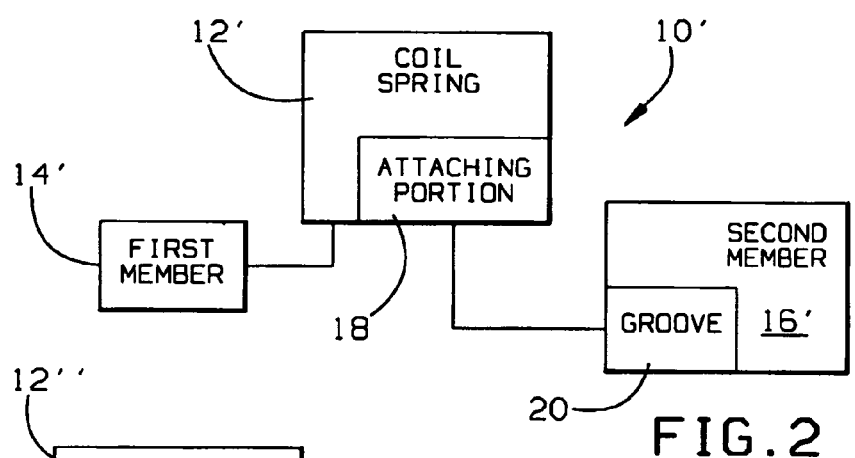
FIG. 2 is a schematic representation of a system as in FIG. 1 wherein one end of the coil spring is attached to the second member within a groove therein.

In FIG. 2, there is a slightly more specific, but generic, showing of a system 10', as in FIG. 1, consisting of first and second members 14', 16', operatively connected through a coil spring 12'. In this embodiment, the coil spring 12' has an attaching portion 18 that is clamp fit within a groove 20 on the second member 16'. The coil spring 12' can be operatively attached to the first member 14' using a similar groove arrangement, or by any other means consistent with the teachings described hereinbelow.

Figure 3:
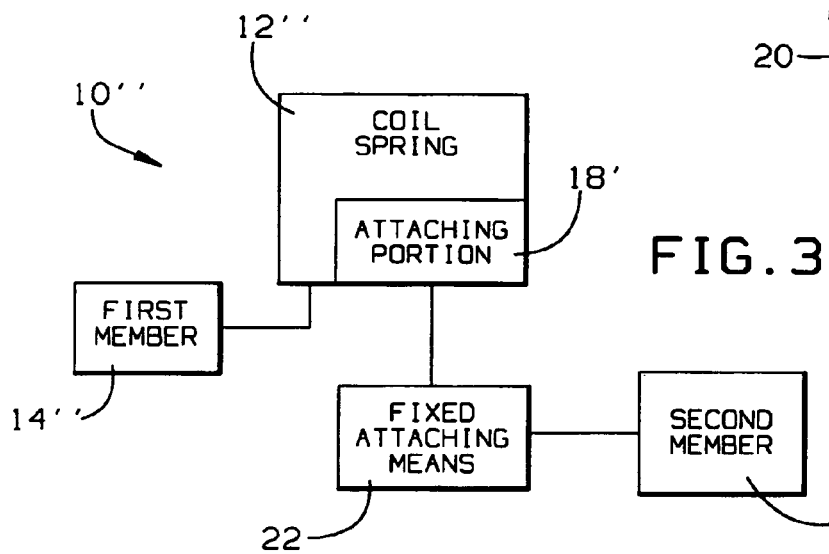
FIG. 3 is a schematic representation of a modified form of system as in FIG. 1 wherein a portion of the coil spring is attached to the second member through fixed attaching means.

In FIG. 3, another form of system is shown at 10" consisting of a coil spring 12" acting between a first member 14" and second member 16". An attaching portion 18' on the coil spring 12" is operatively attached to the second member 16" through a fixed attaching means 22, which may include brazing, welding, adhesive, or the like. The coil spring 12" could be operatively attached to the first member 14" by like fixed attaching means, or by any other means as would be apparent to one skilled in the art based on the disclosure hereinbelow.

Figure 4:
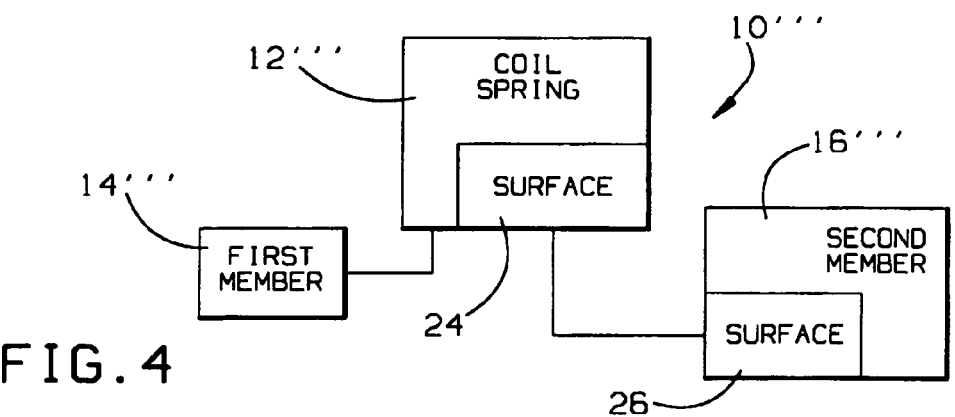
FIG. 4 is a schematic representation of another form of system as in FIG. 1 wherein an end of the coil spring is attached to the second member through cooperating surfaces thereon.

In FIG. 4, yet another form of system, according to the invention, is shown at 10''', to include a coil spring 12''' that acts between first and second members 14''', 16''', respectively. In this embodiment, one portion of the coil spring 12''' has a surface 24 that frictionally grips a cooperating surface 26 on the second member 16''' to operatively attach the coil spring 12''' to the second member 16'''. In one form, the cooperating surfaces 24, 26 face radially with respect to the central axis of the coil spring 12'''. The coil spring 12''' can be operatively attached to the first member 14''' by a like arrangement, or by any other arrangement that would be apparent to one skilled in the art based upon the disclosure herein.

While the inventive concept has a broad application to many structures in many different fields, it is particularly adaptable to a pulley assembly, in which environment the invention will be described in detail hereinbelow. As just one example, the first member 14 on the exemplary system 10 may be capable of cooperating with a power transmission belt to drive/be driven by a cooperating power transmission belt. The first member 14 in this application is movable guidingly relative to the second member around an axis. The coil spring 12 has a length and a circumference and is attached to the first and second members 14, 16 so that a force tending to move the first/second member around the axis is transmitted through the coil spring to the second/first member.

Figure 5:
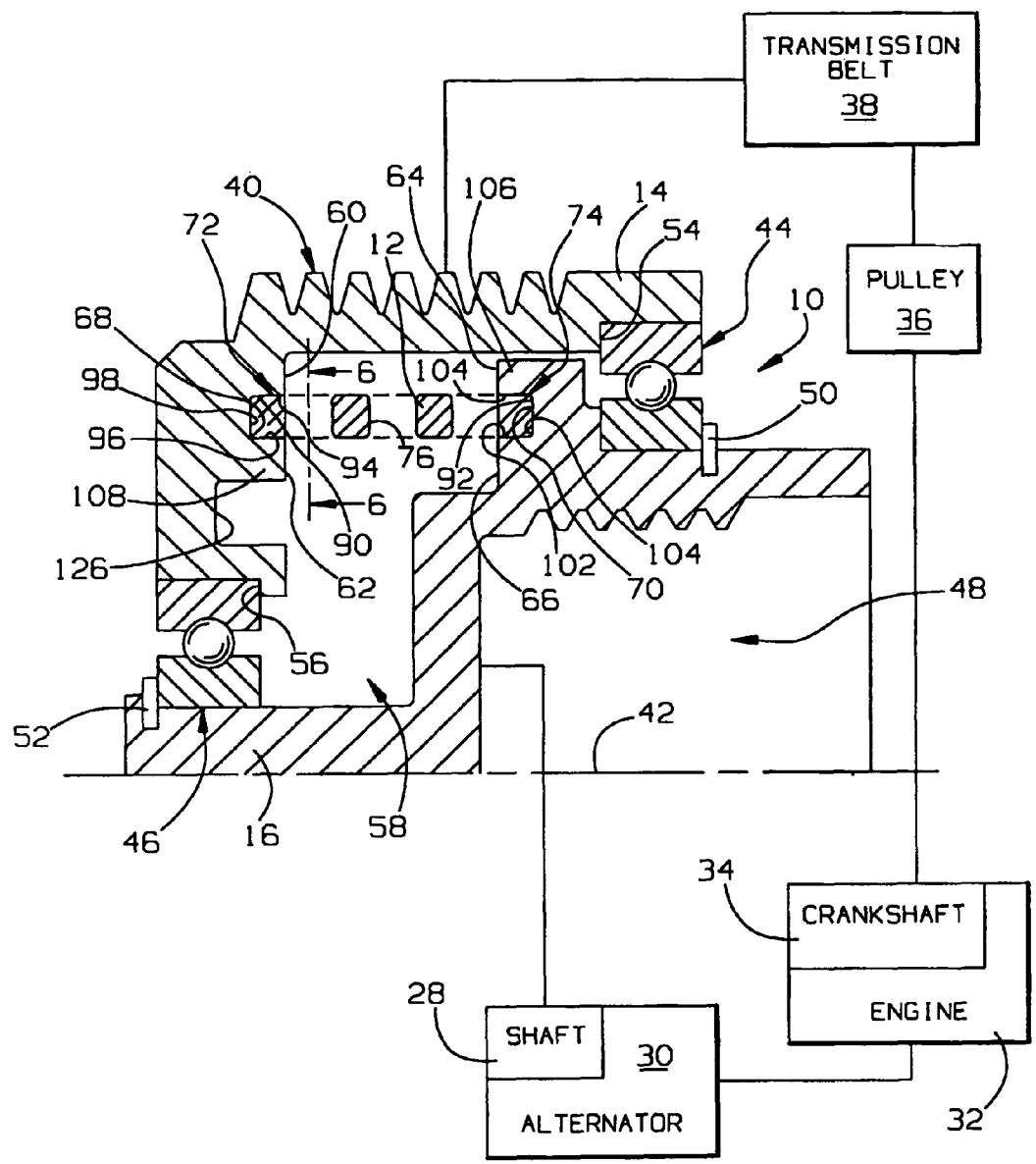
FIG. 5 is a partially schematic, fragmentary, cross-sectional view of a system as in FIGS. 1-4 in the form of a pulley assembly on an alternator on an engine.
Figure 6:
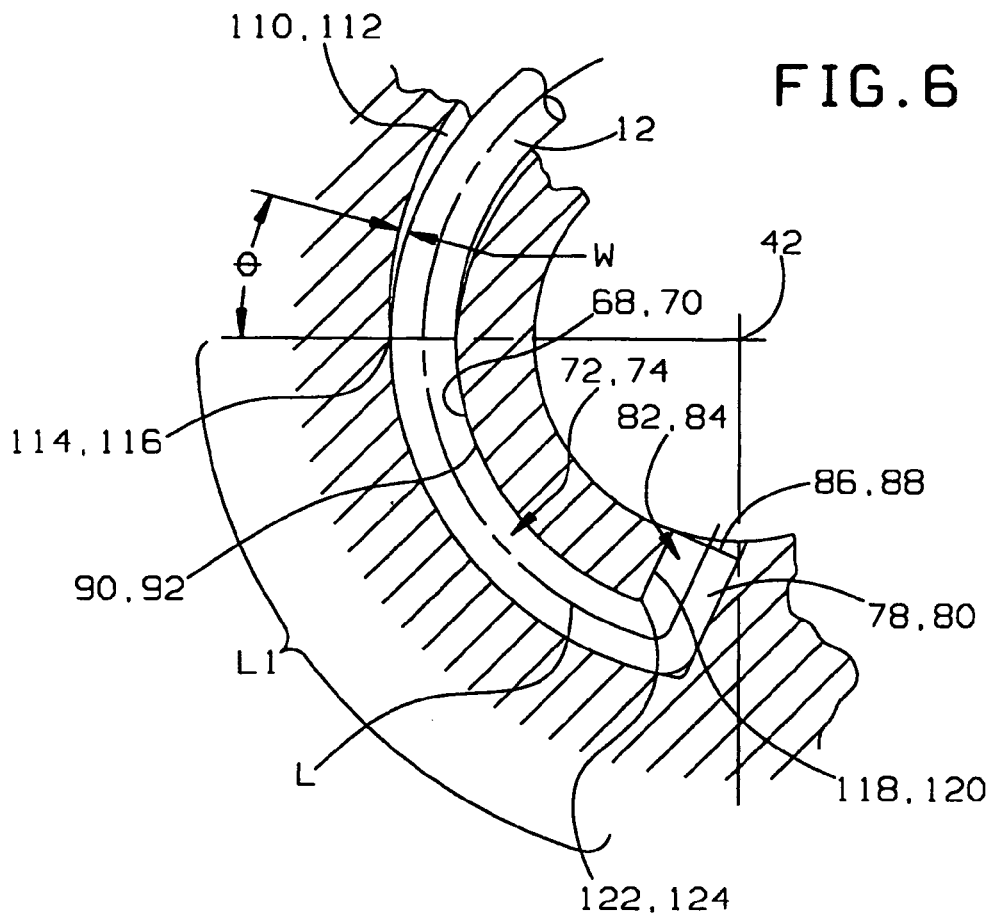
FIG. 6 is an enlarged, cross-sectional view of the pulley assembly taken along line 6-6 of FIG. 5.

Referring to FIGS. 5 and 6, a first specific embodiment will be described wherein the system 10 is in the form of a pulley assembly. As one example, which should not be considered limiting, the pulley assembly 10 is associated with a shaft 28 on an alternator 30 upon an engine 32. The engine crankshaft 34 drives a pulley 36, which in turn drives an endless transmission belt 38, that in turn drives the first member 14, that is in the form of a pulley. In this embodiment, the first member/pulley 14 has a ribbed external surface 40 about which the power transmission belt 38 wraps to drivingly engage the same. The first member/pulley 14 may consist of a single piece or multiple pieces, with it being understood that the description "first member/pulley 14" is intended to encompass a one-piece or multiple piece structure that rotates as a unit around a first axis 42 relative to the second member 16 that connects to the alternator shaft 28.

The first member/pulley 14 surrounds the second member 16. Through axially spaced bearings 44,46, the first member/pulley 14 and second member 16 are mounted with respect to each other and guided in relative rotation around the axis 42.

In this embodiment, the second member 16 has a bore 48 to accommodate the alternator shaft 28.

To prevent the first member/pulley 14 and second member 16 from separating by relative axial movement, axially spaced stop members 50,52 project radially from the second member 16 to captively embrace the bearings 44, 46. The bearings 44, 46 in turn act against oppositely axially facing shoulders 54, 56 on the first member/pulley. 14 in a similar captive arrangement. This precise structure should not be viewed as limiting. As one example, the use of the bearings 44, 46 is not a requirement. The overall construction may be simplified by using, for example, dry metals.

The first member/pulley 14 and second member 16 cooperatively define a chamber 58 within which the coil spring 12 is located. The first member/pulley 14 has a radially extending wall 60 with an axially facing surface 62 at one end of the chamber 58. The second member 16 has a radially extending wall 64 with a surface 66 facing axially towards the wall surface 62 at the opposite end of the chamber 58.

Arcuate grooves 68, 70 are formed in the walls 60, 62 axially through the surfaces 62, 66, respectively. The grooves 68, 70 respectively accommodate coil spring portions 72, 74, in this case shown as the axially spaced, terminal ends for the coil spring 12. However, it is not a requirement that the coil spring portions 72, 74 be at the spring ends.

In this embodiment, the coil spring 12 has a length that is wrapped to define a plurality of coils/turns 76 that each extends through no more than 360° around the axis 42. The coil spring 12 is shown with a squared configuration taken in cross section transversely to its length, though this is not a requirement. The grooves 68, 70 have a complementary shape.

With the coil spring 12 in the spring chamber 58, the central axis of the coil spring 12 coincides with the first axis 42. The end portion 72 resides in the groove 68, with the opposite end portion 74 residing in the groove 70.

As seen in FIGS. 5 and 6, the cooperation between the spring end portions 72, 74 and the grooves 68, 70 is the same at each end of the coil spring 12. The end portions 72, 74 are curved to reside, one each, in a complementarily-shaped groove 68, 70. Bent ends 78, 80 define generally radially extending end lengths 82, 84 that terminate at free ends 86, 88. In this embodiment, the end lengths 82, 84 are substantially orthogonal to the line of curvature L for the end portions 72, 74 in their respective grooves 68, 70. The end lengths 82, 84 lock the end portions 72, 74 with respect to the first member/pulley 14 and second member 16. As will now be explained, the surfaces 90, 92, bounding the grooves 68, 70, and end portions 72, 74 of the coil spring 12 cooperate in a manner so that the coil spring 12 is clamp fit within the grooves 68, 70 over a specific circumferential length thereof. With this arrangement, the first member/pulley 14 and second member 16 are elastically connected to each other through the coil spring 12.

The groove surface 90 has three surface portions 94, 96, 98 that engage the end portion 72 of the coil spring 12. The surface portions 94, 96 radially face each other, with the surface portion 98 facing axially. The groove surface 92 has corresponding surface portions 100, 102,104 to engage the end portion 74 of the coil spring 12, and opens axially oppositely to the groove 68.

The end portions 72, 74 of the coil spring 12 are clamp fit within their respective grooves 68, 70 over a clamping length L1. The grooves 68, 70 over this clamping length L1 have a shape complementary to the cross section of the coil spring 12, but are actually slightly dimensionally smaller, whereby the end portions 72, 74 can be securely press fit into their respective grooves 68, 70 and firmly held in place therein by the groove surfaces 90, 92. Thus, there is no radial gap between the end portions 72, 74 and the groove surfaces 90, 92 over the clamping length L1. The end portions 72, 74 thereby become fixed against circumferential movement, as a result of which there is no friction generation between the end portions 72, 74 and the groove surfaces 90, 92 over the clamping length L1. As a consequence, the spring end portions 72, 74 are not prone to excessive wear through repetitive movement that produces frictional wear in operation.

To facilitate assembly of the coil spring 12, the second member 16 has a thin-walled portion 106 radially outside of the groove 70. This allows a certain degree of radially outward flexing of the portion 106 as the spring end portion 74 is pressed axially into the groove 70. Further, in operation, by reason of this construction, the end portion 74 can undergo elastic deformation to avoid uneven deformation that might cause detrimental stress concentrations. That is, elastic deformation of the end portion 74 is permitted to avoid fatigue/breakage of the end portion 74 due to stress concentrations.

For the same purpose, the first member/pulley 14 has a thin-walled portion 108 that is allowed to deflect radially inwardly to facilitate axial insertion of the end portion 72 of the coil spring 12 and permit elastic deformation so as to avoid fatigue of the end portion 72 as the system is operated.

The end portions 72, 74 and grooves 68, 70 are relatively configured so that a radial gap 110,112 is formed that increases progressively from circumferential locations 114, 116 at the ends of the clamping length L1. That is, the gap 110 between the end portion 72 and groove surface 90 increases from the location 114 in a circumferential direction towards the opposite end portion 74. Likewise, the radial gap 112 between the end portion 74 and groove surface 92 increases progressively from the location 116 in a circumferential direction towards the end portion 72. As a result, during operation of the system, as the coil spring 12 repeatedly undergoes elastic deformation, stress concentration at the end portions 72, 74 is avoided. The likelihood of fatigue fracture of the coil spring 12 at the end portions 72, 74 is thus reduced.

Figure 7:
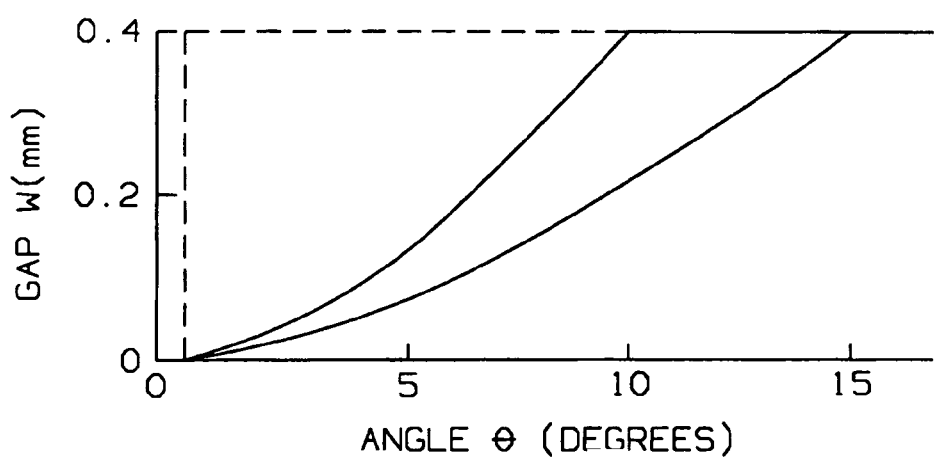
FIG. 7 is a graph showing the relationship between a gap between the coil spring and a groove surface on a cooperating member, at different angular positions.

Preferably, as shown in FIG. 7, in conjunction with FIG. 6, at locations spaced circumferentially from the locations 114, 116 within an angular distance θ, on the order of 5°, the radial gap 110, 112, identified as W in FIG. 6, is in the range of 0.02 to 0.1 mm. This gap dimension may reliably prevent stress concentration at the end portions 72, 74 and the regions there adjacent. In FIG. 7, the dashed lines indicate the nature of the gap in a conventional construction.

As noted previously, the ends 78, 80 are bent at substantially right angles and are received in transverse extensions 118, 120 of the grooves 68, 70. With this arrangement, the end portions 72, 74 wrap around corner surfaces 122, 124 on the first member/pulley 14 and second member 16 to reliably lock the end portions 72, 74 of the coil spring in place against circumferential shifting. This same result could be achieved by reversely bending the ends 78, 80 so that the end lengths 82, 84 project radially outwardly. Further, the right angle bend is not required to produce the "hooked" locking arrangement contemplated. Using the above-described arrangement, locking of the end portions 72, 74 can be achieved positively by potentially not requiring separate securing parts. This facilitates manufacturing of the assembly and potentially reduces manufacturing costs therefor.

With the above-described arrangement, the coil spring 12 generally permits a relatively large angular displacement between the first member/pulley 14 and second member 16, as may not be possible with an annular rubber member, or the like. As a result, efficient absorbing of rotational fluctuations is possible. At the same time, it is also possible with this structure to suppress fluctuations in the tension of the belt so as to avoid belt resonance, that might otherwise generate additional noise in operation. By achieving this end, durability of the belt 38 may also be enhanced.

In FIG. 5, a recess 126 is provided axially through the first member/pulley 14. This reduces the overall weight of the first member/pulley 14 and thereby reduces the rotational moment of inertia. As a result, it may be possible to reduce the angular force required to maintain the speed at any point on the first member/pulley 14 at the speed of the cooperating belt 38. Thus, it is possible to suppress generation of a force in excess of the static frictional force between the first member/pulley 14 and belt 38. It may thus be possible to avoid excessive wear, whereby the serviceable life for the belt 38 may be increased.

The first member/pulley 14 may be made from a number of different materials. Among those that are preferred are light alloys, such as aluminum. This additionally reduces the rotational moment of inertia for the first member/pulley 14 and achieves the same end as does the aforementioned weight reduction attributable to the inclusion of the recess 126.

By reason of not requiring a damping system utilizing viscous fluid, an overall simplification may be achieved, in part by reason of a reduction in the number of required parts. However, the invention contemplates that a damping system might also be used in conjunction with the structure described herein.

More specifically, the spring chamber 58 may be filled with a viscous fluid, such as silicon oil. This adds an attenuation effect to the relative rotational movement between the first member/pulley 14 and second member 16. If a viscous fluid is utilized in the spring chamber 58, by reason of the aforementioned construction of the system 10, no significant modifications need be made, thereby allowing the addition of the feature without a significant increase in production costs for the overall system.

While the coil spring 12 is shown with a squared/rectangular cross-sectional configuration, this is not a requirement. However, a squared cross-sectional shape is preferred over a circular cross-sectional configuration for the following reasons. When the relative angular displacement, the winding number and the spring constant are the same, the maximum tensile (compressive) stress generated in the latter coil spring construction can be reduced to approximately 70%. When the relative angular displacement, the maximum tensile (compressive) stress generated and the spring constant are the same, the requisite winding number for the latter construction is reduced to 70%. As a result, it is desirable to use a spring with a squared cross-sectional configuration. Other configurations, including circular, but not limited thereto, are contemplated.

By reason of the construction described above, the end portions 72, 74 of the coil spring 12 can be axially pressed into their respective grooves 68, 70 in a straight, stable state, without requiring inclination of the coil spring 12 with respect to the axis 42. Generally, if a coil spring is required to be inclined to effect installation, an excessive assembly force may be required, as a result of which the coil spring may be prone to breakage during operation in response to repetitive rotational speed fluctuations for the engine 32. By reason of the axial arrangement and alignment of the grooves 68, 70, oblique/inclined mounting of the coil spring 12 may be avoided. As a result, rotational speed fluctuations encountered during operation can be transmitted uniformly to the entire spring wire, as a result of which an adequate service life can be expected.

As noted previously, use of the system 10 on an alternator is intended to be exemplary in nature only. As one example of an alternative use, the pulley assembly 10 may be provided on the compressor shaft of an automotive air conditioner. The pulley assembly 10 may be used as shown in FIG. 5 on the power output side on the crankshaft 34 of the engine 32. In this case, the rotation of the crankshaft 34 is transmitted from the second member 16 to the first member/pulley 14 to the coil spring 12, whereby the power is output from the first member/pulley 14 to the cooperating belt 38. The pulley assembly 10 can also be used on apparatus other than vehicle-mounted apparatus. As just one other example, the pulley assembly may be used in different rotation transmission systems.

Figure 8:
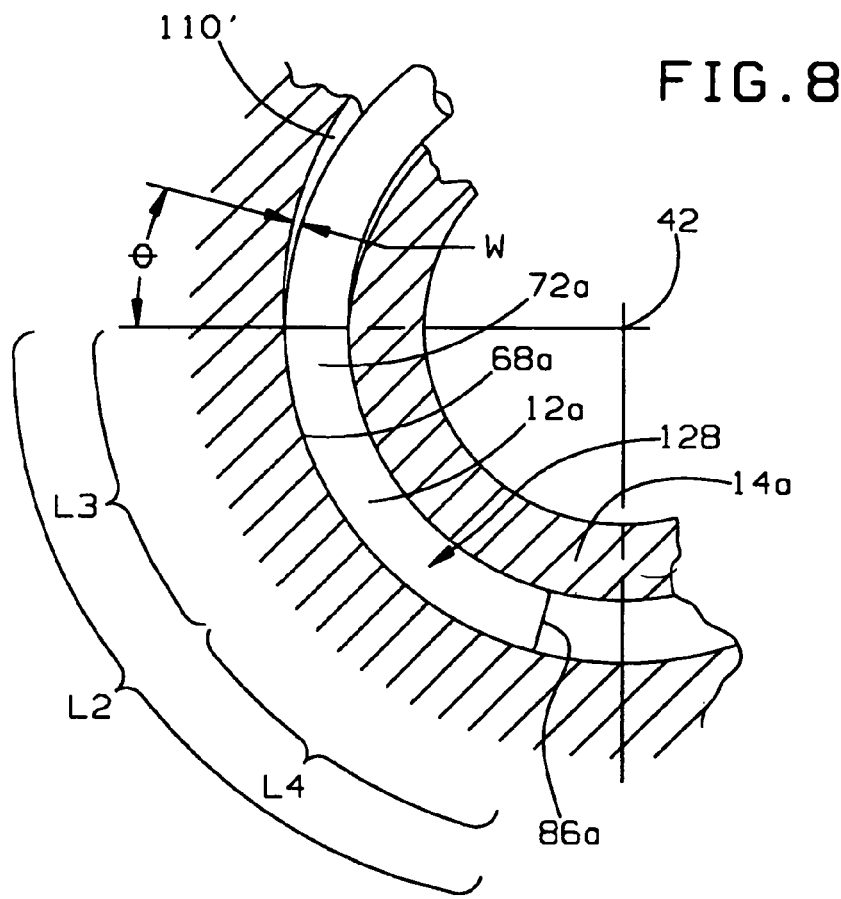
FIG. 8 is a view as in FIG. 6 of a modified form of pulley assembly having a coil spring, wherein a locking portion on the end of the spring in FIG. 6 is eliminated.
Figure 9:
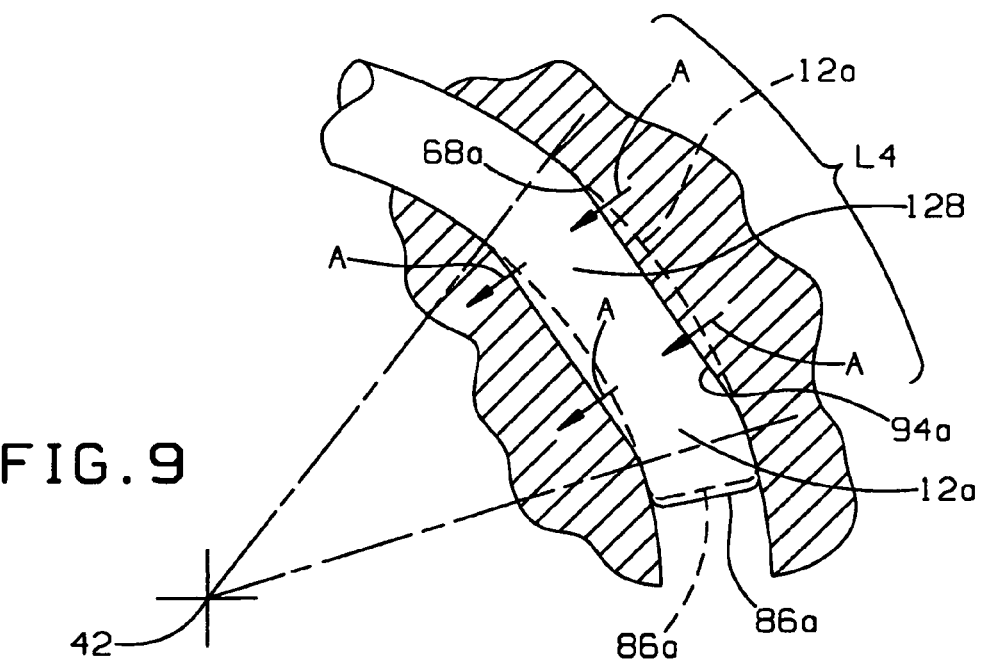
FIG. 9 is an enlarged, fragmentary, axial view of an end portion of the spring in FIG. 8 in relationship to a groove in its cooperating member.

One modification contemplated by the invention is shown in FIGS. 8 and 9. Like components will be identified using the same basic reference numerals with a letter suffix ("a", "b", etc.) and/or with a "'" designation. Further, it should be understood that the connection between the opposite end portions of the coil springs, while shown to be the same with respect to each of the first and second members, is not required to be so, as previously explained. Thus, for purposes of simplicity, the inventive concepts will be described in most cases with respect to the securing of only one end portion of each spring to its respective member.

As shown in FIG. 8, the coil spring 12a cooperates with an exemplary first member/pulley 14a such that the end portion 72a of the coil spring 12a is clamped within the groove 68a over a clamping length L2 so that the first member/pulley 14a at all times follows movement of the end portion 72O of the coil spring 122. Over a first circumferential portion L3 of the clamping length L2, the end portion 72a and groove surface 68a closely engage and cooperate, in the same manner as do the end portion 72 and groove 68, as previously described. That is, the connection between the end portion 72a and groove 68a is without radial gap over the circumferential length L3, with the end portion 72a axially press fit into the groove 68a.

Adjacent to the free end 86a of the coil spring 12a, there is no bend as produces the locking hook configuration in the prior embodiment. Instead, the circumferential length L4 of the coil spring 12a, extending from the end of the length L3 to the free end 86a, is curved continuously, potentially more sharply, over the entire clamping length L4. The locking function afforded by the aforementioned end lengths 82, 84 is achieved by the above-described cooperation between the coil spring 12a and groove 68a along the length L4.

In FIG. 9 the dotted lines at 12a indicate the orientation of the locking length 128, extending over the distance L4, preparatory to direction of the same into the groove 68a and with the locking length 128 in a relaxed state. As can be seen, the relaxed curvature of the locking length 128 does not match the curvature of the groove 68a. In a relaxed state for the locking length 128, the locking length 128 has a larger effective radius, i.e. is more gently curved with respect to the first axis 42 than is the groove 68a. As a result, as an incident of pressing the locking length 128 into the groove 68a, a substantial amount of radially inward, elastic deformation of the locking length 128 is required, as indicated by the arrows A. As the locking length 128 is fit/seated in the groove 68a, the groove surface portion 94a deforms slightly radially outwardly oppositely to the direction of the arrows A. As a result, the loaded locking length 128 and surface portion 94a have residual forces that act against each other to positively secure the locking length 128 within the groove 68a against relative circumferential shifting. This construction obviates the need to provide a severe bend near the free end 86a, as in the prior embodiment, and likewise obviates the need to provide an accommodating extension of the circumferential groove 68a to accommodate such an end length. Accordingly, the construction of the spring 12a and the cooperating member 14a may be simplified.

Figure 10:
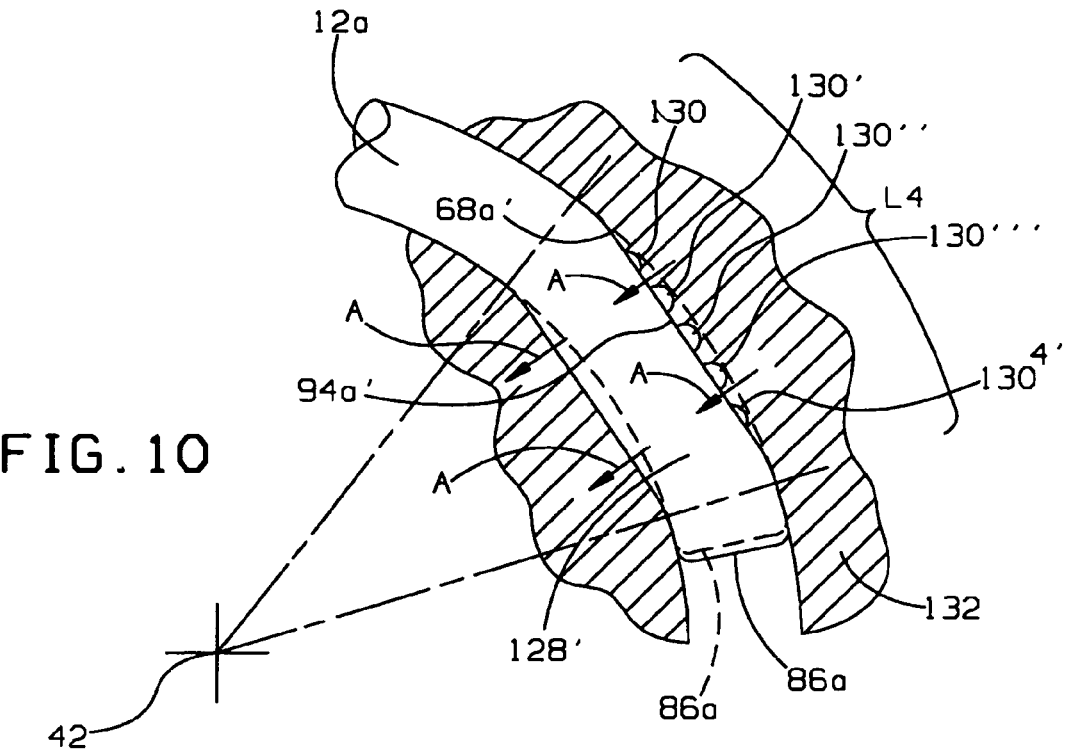
FIG. 10 is a view as in FIG. 9 wherein the cooperating member has recesses.

The structure in FIG. 10 includes the basic elements shown in FIG. 9 but has a modified surface portion 94a' for the groove 68a'. In this embodiment, a plurality of recesses 130, 130', 130''', 130$^{4x'}$ is provided in the groove surface 94a' that is in circumferential coincidence with the locking length 128'. The locking length 128' has the same circumferential length L4 as the corresponding locking length 128 in FIG. 9. At least one, and potentially a plurality in excess of five, such recesses can be provided in the surface portion 94a'. The recesses 130, 130', 130'', 130''', 130$^{4x'}$ perform potentially two different functions.

First of all, the recesses 130-130$^{4x'}$ weaken the wall portion 132 whereby it is more readily elastically deformed in a radial direction to allow proper seating of the locking length 128'. This deformation is further enhanced by reason of providing the plurality of recesses 130-130$^{4x'}$ in side-by-side relationship at circumferentially spaced locations along the groove surface portion 94a'.

At the same time, the coil spring 12a, as it and the groove surface portion 94a' are urged forceably radially against each other, deforms into the recesses 130-130$^{4x'}$, thereby enhancing the frictional holding force between the locking length 128' and the groove surface portion 94a'. This tends to more securely fix the locking length 128' and groove surface portion 94a' against relative circumferential movement, i.e., to positively lock the same.

Press fitting of the locking length 128' into the groove 68a' causes the locking length 128 and its free end 86a to shift from the dotted line positions into the solid line positions in FIG. 10. The locking length 128' radially deforms in the direction of the arrows A, to thereby be loaded against the groove surface portion 94a'.

Figure 11:
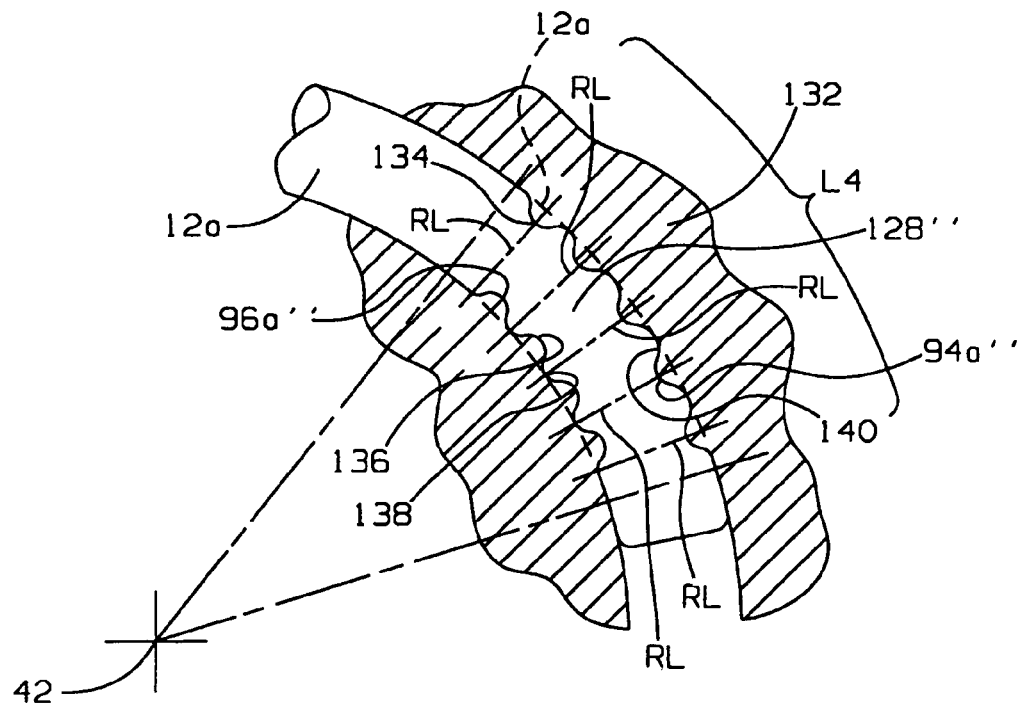
FIG. 11 is a view as in FIGS. 9 and 10 wherein the cooperating member has a groove surface with an undulating serpentine shape.

In FIG. 11, a further modification of the structure shown in FIGS. 8 and 9 is depicted. A radially inwardly facing groove surface portion 94a'' has an undulating serpentine shape that produces radially inwardly directed asperities 134 at regular circumferential intervals along the locking length 128'' (L4). A radially outwardly facing groove surface portion 96a'' has a like, undulating, serpentine configuration defining radially outwardly projecting asperities 136 at regular circumferential intervals along the locking lengths 128''. The asperities 134, 136 are circumferentially offset from each other so that each radial line RL, originating from the first axis 42 and extending through an asperity 134 on the surface portion 94a'', extends through a valley 138 between adjacent asperities 136 on the surface portion 96a''. Similarly, each radial line RL extending through an asperity 136 on the surface portion 96a'' extends through a valley 140 between adjacent asperities 134 on the surface portion 94a''.

With this arrangement, the coil spring 12a is elastically deformed from its dotted line shape radially inwardly by the asperities 134 and radially outwardly by the asperities 136 alternatingly along the locking length 128'' (L4). Consequently, the restoring forces acting radially outwardly on the surface portion 94a'' and radially inwardly on the surface portion 96a'' alternate circumferentially, whereby the frictional force between the coil spring 12a and the surface portions 94a'', 96a'' is enhanced. This structure may be used as an alterative to the use of a non-matching curvature between the coil spring 12a and groove surfaces cooperating therewith, as shown for example in FIGS. 9 and 10.

While the asperities 134, 136 are shown as discrete projections, it is contemplated that asperities defined by any roughened surface may be employed to achieve a locking effect between a locking length of a coil spring portion and a complementary groove surface.

In the embodiments shown in FIGS. 8-11, it is contemplated that the same radial gap 110' (FIG. 8) be maintained between the coil springs and cooperating groove surfaces, with the same widths (W) at the same angular locations, identified by the symbol θ, as in the prior embodiment.

Figure 12:
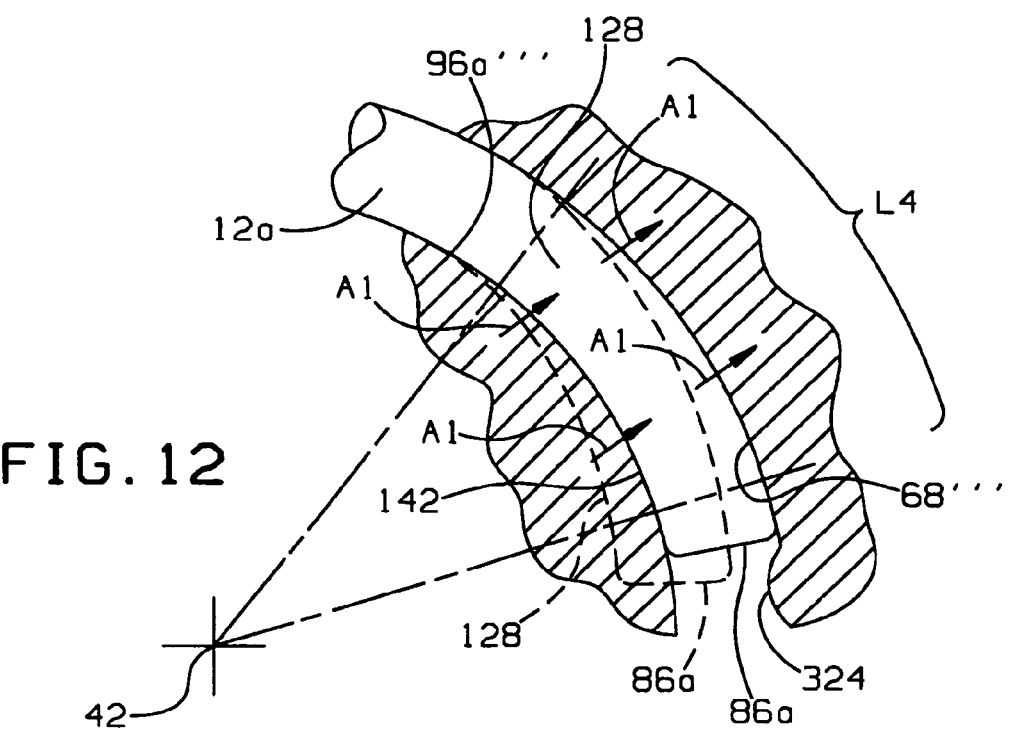
FIG. 12 is a view as in FIGS. 9-11 wherein the relative curvatures of the groove and spring are different.

In FIG. 12, a further modification is shown in a structure similar to that shown in FIG. 9. In FIG. 9, the locking length 128 must be bent radially inwardly to fit into the groove 68a. In FIG. 12, the locking length 128, in a relaxed state, and groove 68''' have curvatures that are different such that the locking length 128 must be bent radially outwardly, as indicated by the arrows A1, to fit the locking length 128 in the groove 68''' over the distance L4. The locking length 128 is shown in dotted lines in FIG. 12 with the locking length 128 on the coil spring 12a in a relaxed state.

Once the locking length 128 is inserted into the groove 68''', the groove surface portion 96a''' and abutting spring surface 142 elastically deform in a manner that restoring forces therein cause the locking length 128 to be firmly fixed and locked in place along the clamping length L4.

Figure 13:
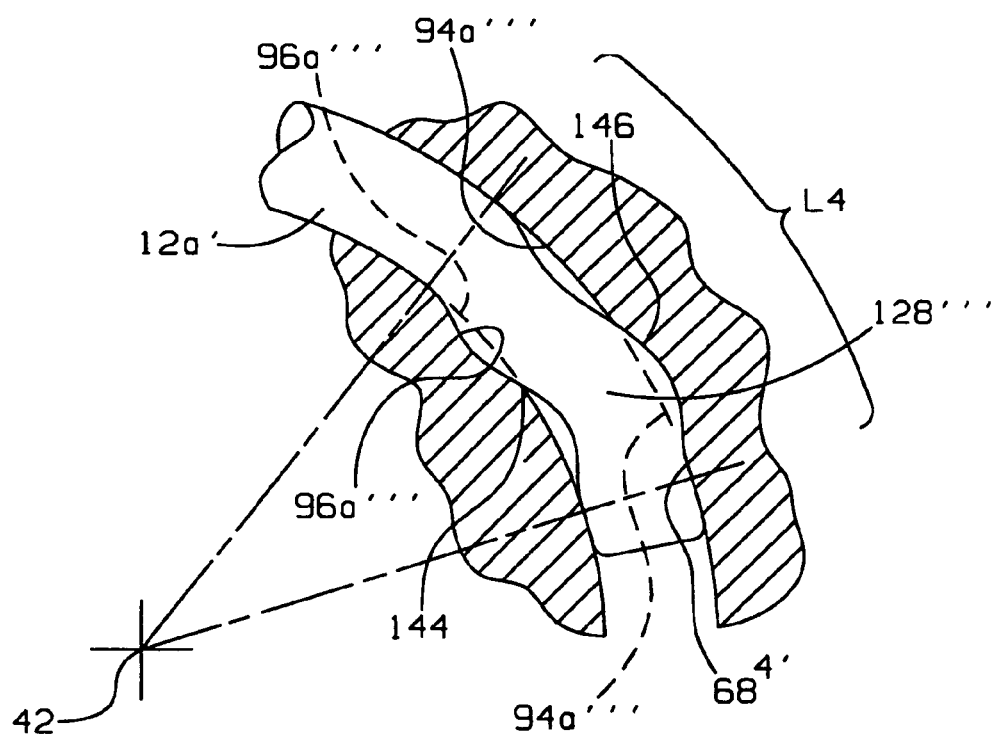
FIG. 13 is a view as in FIGS. 9-12 wherein the spring has an undulating serpentine shape.

In FIG. 13, a modification is shown to a structure similar to that in FIG. 11, however, with radially inwardly and outwardly facing surfaces 144, 146 on the coil spring 12a' having undulating, serpentine shapes on the locking length 128''' over the distance L4. The groove surface portions 94a''', 96a''' are shown in dotted lines before insertion of the locking length 128''' into the groove $68^{4x'}$. Once the locking length 128''' is press fit into the groove $68^{4x'}$, the wall surface portions 94a''', 96a''' and coil spring surfaces 144, 146 are radially, elastically deformed.

With this configuration, and that shown in FIG. 11, there results an elastic deformation alternating radially inwardly and outwardly along the circumferential extent of the grooves, whereby the resulting restoring forces act likewise alternatingly therealong. Thus, it is possible to substantially enhance frictional holding forces between the coil springs and groove surfaces to clamp fit and lock the end portions of the coil springs in the grooves.

With the FIG. 13 design, no modification to the groove $68^{4x'}$ is required. The locking capability can be afforded solely by providing a serpentine configuration on the coil spring 12a'. This facilitates processing and potentially increases productivity and reduces manufacturing costs.

Figure 14:
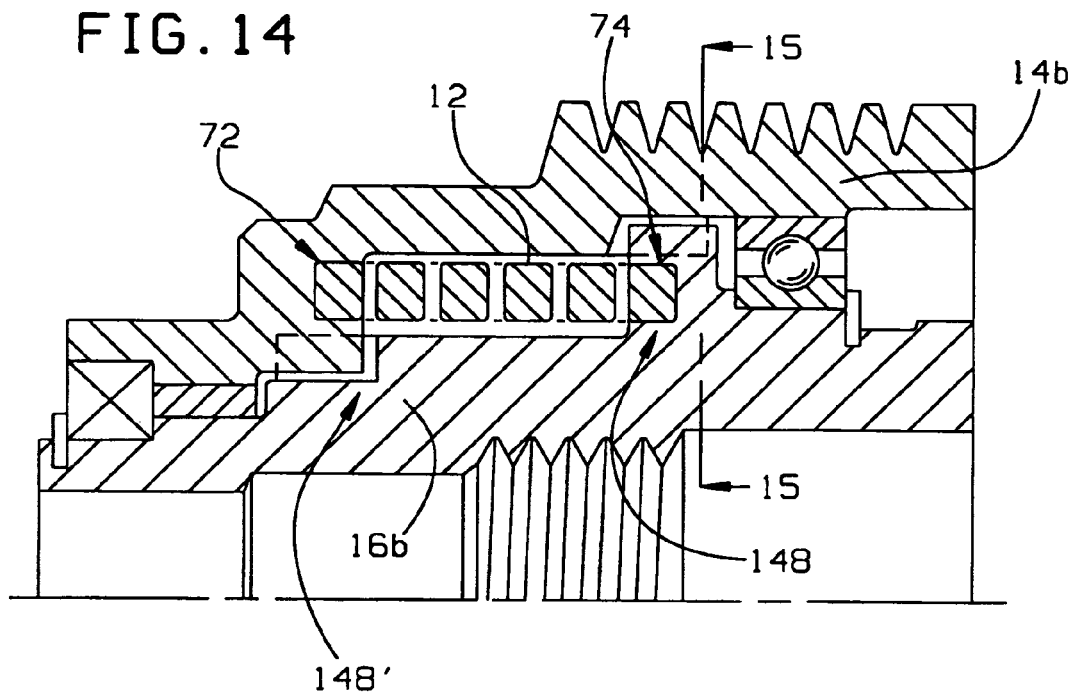
FIG. 14 is a view as in FIG. 5 of a modified form of pulley assembly incorporating stop surfaces to limit relative angular movement between first and second members therein.
Figure 15:
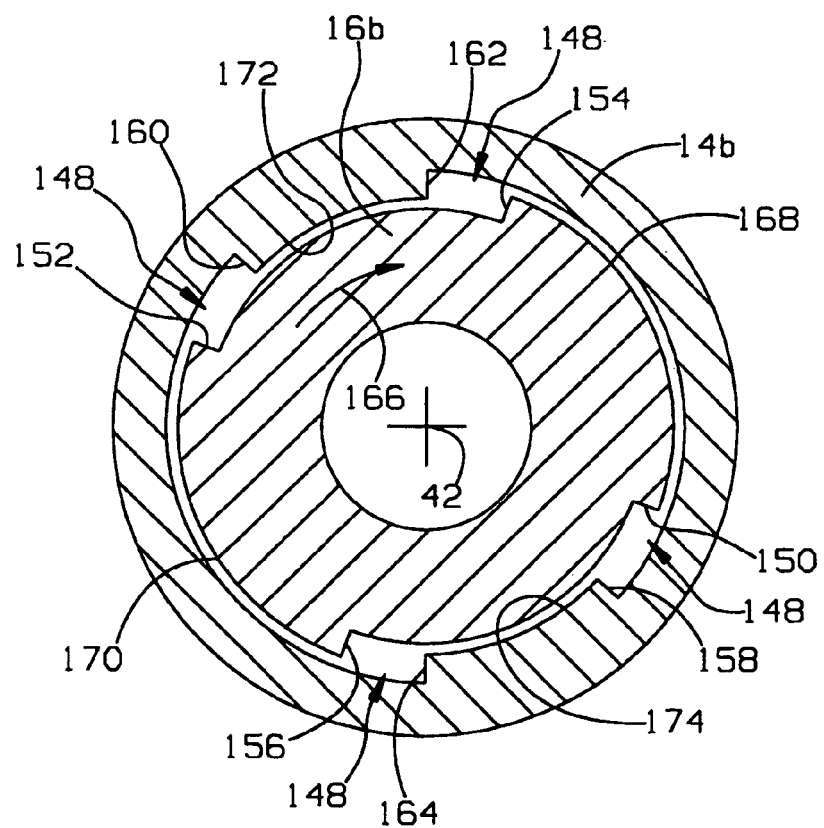
FIG. 15 is a cross-sectional view of the system taking along line 15-15 of FIG. 14.

In FIGS. 14 and 15, a pulley assembly is shown having a first member/pulley 14b that cooperates with a second member 16b in substantially the same manner as the first member/pulley 14 and second member 16 cooperate as shown in FIG. 5. The coil spring 12 has end portions 72, 74 that cooperate respectively with the first member/pulley 14b and second member 16b in the same manner that the end portions 72, 74 cooperate with the first member/pulley 14 and second member 16, as previously explained.

The pulley assembly in FIGS. 14 and 15 differs from that in FIG. 5 primarily by reason of there being rotation regulating assemblies 148, 148' at the axial ends of the coil spring 12. The rotation regulating assemblies 148, 148' are essentially the same, and thus a detailed description thereof will be with respect to only the exemplary rotation regulating assembly 148 in FIG. 15.

More particularly, the rotation regulating assembly 148 consists of diametrically opposite surfaces 150, 152 on the second member 16b, facing in a first circumferential direction, and diametrically opposite surfaces 154, 156 facing in the same circumferential direction, oppositely to the direction faced by the surfaces 150, 152.

The first member/pulley 14b has diametrically opposite surfaces 158, 160, respectively facing the surfaces 150, 152. The first member/pulley 14b has additional surfaces 162, 164, respectively facing the surfaces 154, 156 on the second member 16b.

As the first member/pulley 14b is pivoted in one direction, as indicated by the arrow 166, around the axis 42 and relative to the second member 16b, the facing surfaces 150, 158 and 152, 160 abut. Pivoting movement opposite the direction of the arrow 166 around the axis 42 causes the surfaces 154, 162 and 156, 164 to abut.

Accordingly, the surfaces 150-164 cooperate to set the permissible relative angular movement between the first member/pulley 14b and second member 16b. The spacing between the cooperating surfaces 150, 158; 156, 164; 152, 160; and 154, 162 determines the extent of relative angular movement that is permitted between the first member/pulley 14b and second member 16b.

In this embodiment, radially overlapping protrusions 168, 170, extending radially outwardly from the second member 16b, and 172, 174 extending radially inwardly from the first member/pulley 14b, define the surfaces 150-164. Other arrangements could be utilized to define rotation limiting structure between the first member/pulley 14b and second member 16b. Additionally, the redundant interaction of surfaces at diametrically opposite locations is not required, although it is preferred.

By limiting relative angular movement between the first member/pulley 14b and second member 16b, the maximum deformation permitted for the coil spring 12 is dictated in such a manner that excessive force cannot be applied to the spring 12, thereby avoiding fatigue and potentially breakage thereof.

Figure 16:
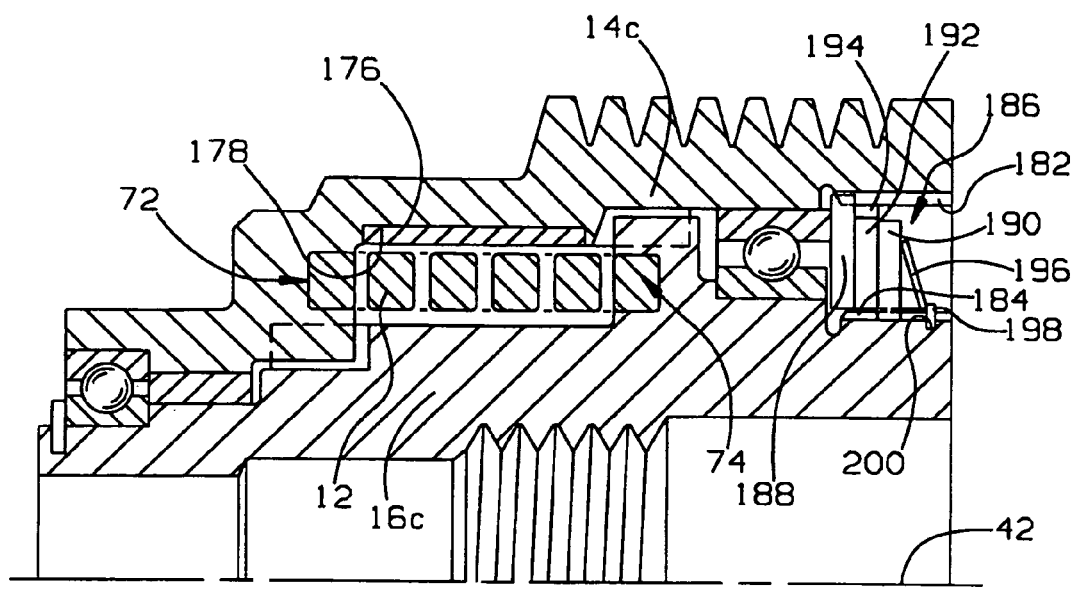
FIG. 16 is a cross-sectional view of a modified form of pulley assembly including a spring holder radially outside of the coil spring.

In FIG. 16, a pulley assembly is shown similar to that in FIGS. 14 and 15, including a first member/pulley 14c and a second member 16c. The coil spring 12 has end portions 72, 74 that are joined to the first member/pulley 14c and second member 16c essentially in the same manner that the end portions 72, 74 are joined to the first member/pulley 14 and second member 16 in FIG. 5.

In this embodiment, a cylindrically-shaped spring holder 176 is extended around the periphery of the coil spring 12. The spring holder 176 is fixed to a radially inwardly facing surface 178 on the first member/pulley 14c. The spring holder 176 limits radial deformation of the coil spring 12, thereby to prevent damage that might otherwise result thereto.

The spring holder 176 may be made from any of a number of different materials, including synthetic resins, such as polyacetal, polyarylate and nylon, a rubber material, and a polyurethane elastomer material. These materials are exemplary in nature only.

Figure 17:
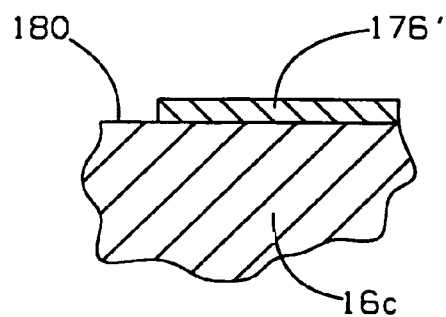
FIG. 17 is a fragmentary, cross-sectional view of a modified form of one of the members in FIG. 16, wherein a spring holder resides radially inside of the coil spring.

In an alternative design, as shown in FIG. 17, a cylindrical spring holder 176' may be attached to a radially outwardly facing surface 180 on the second member 16c to thereby limit detrimental deformation of the coil spring 12 by reason of the coils thereon being constricted in operation, whereby the effective diameter of the coil spring 12 is diminished.

As a further alternative, the spring holders 176, 176' can both be utilized to thereby limit expansion and contraction of the coil spring 12 to a degree that avoids detrimental deformation thereof.

In addition to controlling the degree of radial deformation of the coil spring 12, the spring holders 176, 176' also prevent direct contact between the coil spring 12 and the surfaces 178, 180, respectively on the first member/pulley 14c and second member 16c, thereby to avoid damage induced by friction between these component surfaces. This is particularly desirable when the radial clearance for the spring 12, in both radial inward and outward directions, is made small for a compact overall construction, as shown in FIG. 16.

Each spring holder 176, 176', while described as cylindrical, may be provided with a slit, a straight groove, etc. thereon.

In the pulley assembly in FIG. 16, radially spaced and axially extending retainer and pressure grooves 182, 184 are respectively provided in the first member/pulley 14c and second member 16c. The grooves 182, 184 are substantially parallel to each other. Within the space 186 between the grooves 182, 184, retainer and pressure plates 188, 190 are provided, each having a disk-like configuration. A part of the retainer plate 188 is engaged within the retainer groove 182 so as to be thereby guided in an axial direction but keyed against pivoting around the axis 42 relative to the first member/pulley 14c. In like fashion, the pressure plate 190 is engaged with the groove 184 to thereby be guided slidingly in the axial direction and confined against rotational movement relative to the second member 16c around the axis 42.

Between the retainer and pressure plates 188, 190, a disk-like friction member 192 is captively held against axial movement. The friction member 192 has a peripheral ring 194 thereon to align the axis of the ring 194 with the first axis 42. The ring 194 cooperates with the first member/pulley 14c in a manner that the ring 194 is slidable guidingly both circumferentially and axially relative to the first member/pulley 14c.

The pressure plate 190 is urged, from right to left in FIG. 16, by a biasing member 196, thereby to press the friction member 192 against the retainer plate 188. As a result, the friction member 192 is held in close contact with each of the retainer plate 188 and pressure plate 190.

As noted above, the retainer plate 188 rotates with the first member/pulley 14c, with the pressure plate 190 rotating with the second member 16c. As a result of this arrangement, relative rotation between the first member/pulley 14c and second member 16c is resisted by frictional forces generated between the friction member 192 and the retainer and pressure plates 188, 190.

The biasing member 196 may take a number of different forms. As one example, the biasing member 196 may be a Belleville spring. The spring 196 is compressibly captured between the pressure plate 190 and a retaining ring 198 set within an annular groove 200 in the second member 16c.

By reason of the friction generation between the friction member 192 and retainer and pressure plates 188, 190, in addition to resisting relative rotational movement between the first member/pulley 14c and second member 16c, this arrangement limits deformation of the coil spring 12, thereby potentially increasing its useful life.

The friction member 192 may be made from a number of different materials, including synthetic resins, such as polyacetal, polyarylate, and nylon, a rubber material, and a polyurethane elastomer material. However, the particular material selected is not critical to the present invention.

Figure 18:
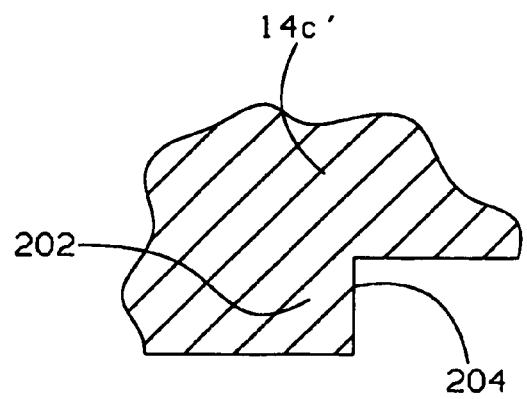
FIG. 18 is a fragmentary, cross-sectional view of a modified form of one of the members where an L-shaped receptacle/groove is defined for a spring end as opposed to a U-shaped groove as in FIG. 16.

Many variations from the basic structure described above are contemplated. As one example, the retainer plate 188 may be omitted. As shown in FIG. 18, a radially extending flange 202 may be provided on the first member/pulley 14c' to define an axially facing surface 204 against which the friction member 194 can be pressed through the pressure plate 190 and biasing member 196.

Figure 19:
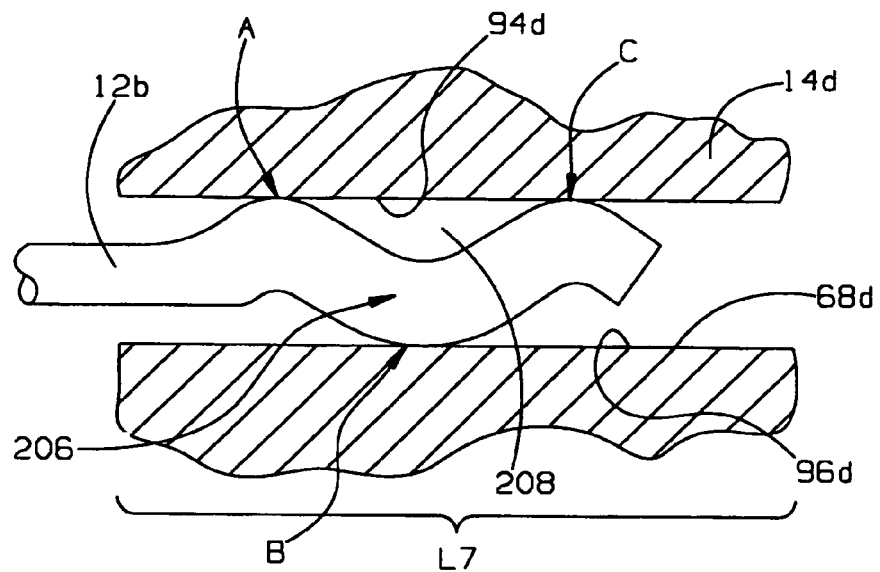
FIG. 19 is a view as in FIG. 6 showing a modified form of coil spring having an undulating serpentine portion, with the curved groove and coil spring shown to be straight for simplicity.

A further variation of the invention is shown in FIG. 19 on a representative first member/pulley 14d having a groove 68d.

For purposes of convenience, the groove 68d will be shown as straight, although in actuality it is arcuate, as in the previously described embodiments.

The groove 68d is wider than the stock from which the associated coil spring 12b is made. In this embodiment, the groove 68d has a uniform width, as opposed to the construction shown for the grooves 68, 70 in FIG. 6. This groove construction is commonly characterized as a "parallel groove", wherein the groove surface portions 94d, 96d are at all locations parallel to each other. With the parallel groove configuration, no special processing is required. This feature contributes to more economical manufacture.

Over the length L7, where the coil spring 12b is clamp fit within the groove 68d, the coil spring 12b has an undulating, serpentine portion 206 that is press fit within the groove 68d. The gap 208 between the serpentine portion 206 and the groove surface portions 94d, 96d increases and decreases gradually, which thereby prevents stress concentration in response to rotational speed fluctuation of the associated engine crankshaft 34.

It is preferred with this construction that the serpentine portion 206, which in this embodiment functions as a locking length over the dimension L7, has at least three distinct contact locations with the groove surfaces portions 94d, 96d. In this embodiment, these three locations are shown in at A, B and C.

With this construction, the serpentine portion 206 is securely clamp fit within the groove 68d. As a result, the serpentine portion 206 is not prone to circumferentially sliding with respect to the groove 68d or from being separated therefrom, as by movement in an axial direction relative to the first member/pulley 14d.

Additionally, the multiple contact points at A, B and C stabilize the attitude and orientation of the coil spring 12b. Additional contact locations are also contemplated.

It is also desirable that the press fitting margin of the serpentine portion 206 with respect to the groove surface portions 94d, 96d be within a range of 0.1 mm to 0.5 mm. Within this range, it is possible to generate a locking force that is large enough to prevent the serpentine portion 206 from circumferentially sliding within, or axially separating from, the groove 68d. This arrangement also facilitates assembly between the coil spring 12b and first member/pulley 14d.

Figure 20:
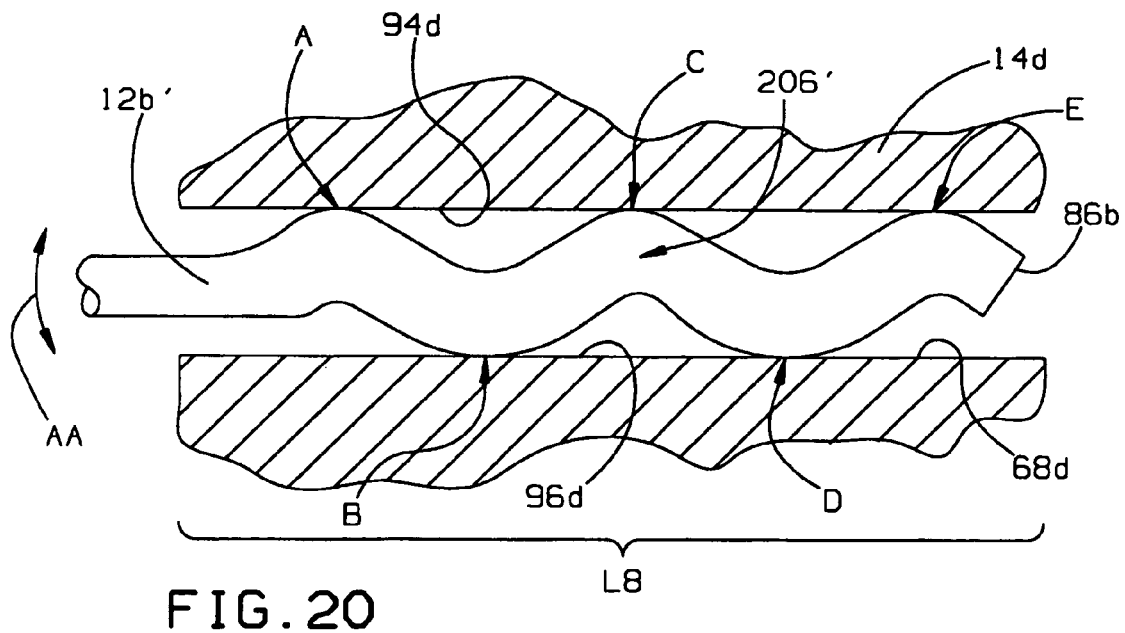
FIG. 20 is a view as in FIG. 19 wherein the coil spring is shown with a modified undulating serpentine portion.

In FIG. 20, a modified form of serpentine portion is shown at 206' within the same groove 68d on the first member/pulley 14d. In this embodiment, the serpentine portion 206' contacts the groove surface portions 94d, 96d at five different locations over the clamping length L8. The clamping locations are circumferentially spaced and identified as A, B, C, D and E. The press fitting margin of the serpentine portion 206' with respect to the groove 68d gradually decreases away from the free end 86b thereon.

In the construction shown in FIG. 20, the stress on the coil spring 12b' gradually increases from the free end 86b towards the opposite end. There is an uneven stress profile along the length of the coil spring 12b, with the maximum stress generated furthest from the free end 86b.

By making the press fitting margin small where the bending deformation load is largest, repeated stressing of the coil spring 12b' induced by load induced twisting at that location, as indicated by the double headed arrow AA, can be controlled, as a result of which the belt life may be extended over what it would be in the absence of this feature.

More specifically, it is desirable that the press fitting margin for the serpentine portion 206' with respect to the groove

68d be relatively small, and less than 0.1 mm furthest from the free end 86b, and larger, on the order of 0.1 mm or greater, nearer to the free end 86b.

It is preferred in the embodiment in FIG. 20 that the coil spring 12b' be squared, and preferably rectangular, as viewed in cross section transversely to the length of the coil spring 12b'.

Figure 21:
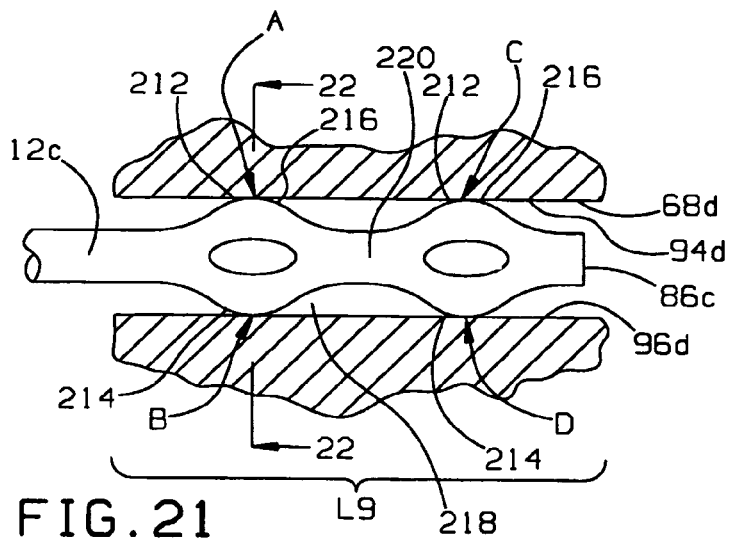
FIG. 21 is a view as in FIGS. 19 and 20 and showing a modified form of coil spring having locally widened portions cooperating with a groove surface.
Figure 22:
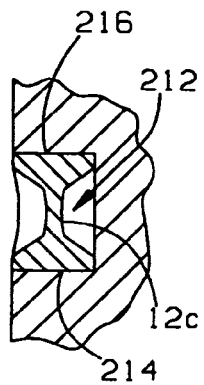
FIG. 22 is a cross-sectional view of the pulley assembly taken along line 22-22 of FIG. 21.

In FIGS. 21 and 22, a modified form of coil spring is shown at 12c. As FIGS. 19 and 20, FIG. 21 depicts the arcuate groove 68d as straight, for purposes of simplicity. The coil spring 12c has locally widened portions 212 at circumferentially spaced locations within the length L9 at which the coil spring 12c is clamp fit within the groove 68d. In this embodiment, there are two of the widened portions 212. Each widened portion 212 has oppositely facing, convexly curved surfaces 214, 216, which respectively engage the groove surface portions 96d, 94d. The groove 68d can be made with a parallel construction, as a result of which the process of forming the groove 68d may be facilitated at a reasonable cost.

The gaps 218 between the widened portions 212 and the groove surface portions 94d, 96d increase and decrease gradually thereby to prevent stress concentration on the coil spring 12c as rotational speed fluctuations are experienced. As noted above, this may avoid or extend the time to fatigue fracture of the coil spring 12c along the clamping length L9.

By reason of providing, in this case two, locally widened portions 212, certain advantages may be realized. More than the two widened portions 212 can be utilized according to the invention. The clamping force between the coil spring 12c and groove surfaces 94d, 96d can be made large enough to prevent sliding of the locking length 220 circumferentially with respect to the groove 68d. This force is also adequate to prevent axial separation of the coil spring 12c from within the groove 68d. In this embodiment, there are four separate contact locations, A, B, C, D between the coil spring 12c and the groove surfaces 94d, 96d. Accordingly, the orientation of the coil spring 12c can be stably maintained. Bending deformation loads on the coil spring 12c may be distributed through the contact locations to avoid localized stress concentration.

In one form, the widened portions 212 are formed by forcibly compressing the coil spring 12c strategically at the desired locations along the length thereof. That is, the coil spring 12c is compressed transversely to its length. This process facilitates low cost manufacture. Further, the width of the widened portions 212 can be varied conveniently through this process by controlling the compressive force used to form the same. This further contributes to efficient manufacture.

It is preferred, but not required, that the coil spring 12c have a squared/rectangular cross-sectional configuration. As shown in FIG. 22, it is possible to compress the coil spring 12c at a central location midway between the surfaces 214, 216, thereby to enlarge the width, that is equal to the spacing between the surfaces 214, 216 at their apices.

Figure 23:
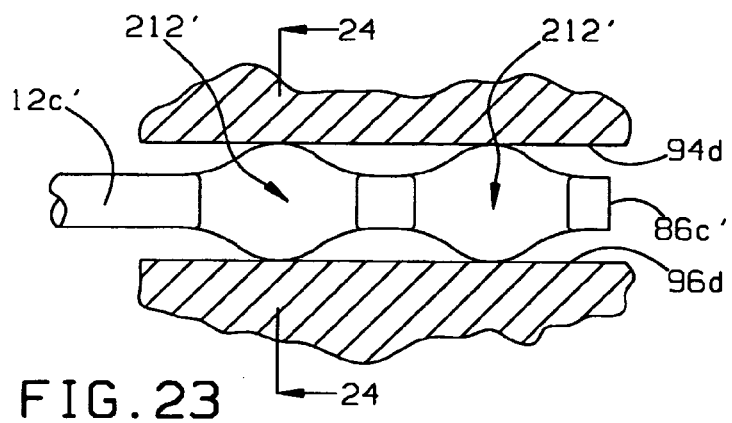
FIG. 23 is a view as in FIG. 21 wherein the locally widened portions have a modified shape from those in FIG. 21.
Figure 24:
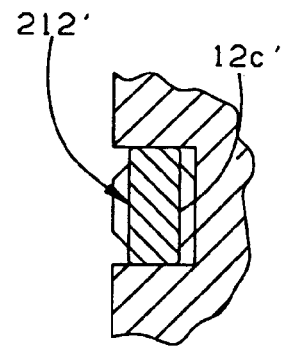
FIG. 24 is a cross-sectional view of the pulley assembly taken along line 24-24 of FIG. 23.

As shown in FIGS. 23 and 24, the coil spring 12c' can be compressed, as between two planar surfaces, to produce the locally widened portions 212' spaced from and/or at the free end 86c'.

Figure 25:
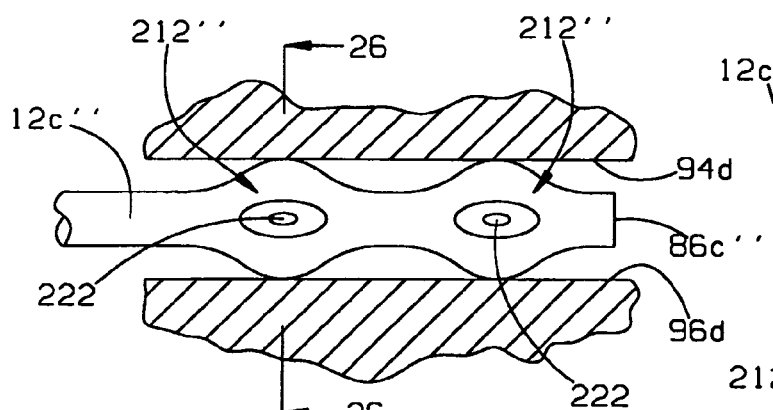
FIG. 25 is a view as in FIGS. 21 and 23 and showing a further modified shape of locally widened portions on the spring.
Figure 26:
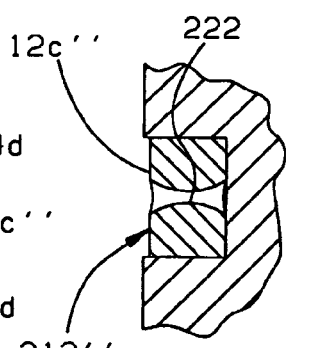
FIG. 26 is a cross-sectional view of the pulley assembly taken along line 26-26 of FIG. 25.

As a further alternative, as shown in FIGS. 25 and 26, locally widened portions 212" can be formed by initially forming through bores 222 in the coil spring 12c", after which the coil spring 12c" can be compressed to enlarge the bores 222 to produce the widened configuration spaced from and/or at the free end 86c". The appropriate press element may be directed against the coil spring 12c" from one side of the bores 222, or from both sides thereof. In the former case, the bores 22 assume a truncated conical shape. In the latter case, the bores 222 assume the shape shown in FIGS. 25 and 26.

As with the embodiments shown in FIGS. 19 and 20, in the embodiments shown in FIGS. 21-26, it is desirable that the press fitting margin of the widened portions 212, 212', 212" with respect to the groove surface portions 94d, 96d be not less than 0.1 mm and not more than 0.5 mm. As in the prior embodiment, it is preferred that the press fitting margin gradually decrease from the free ends 86c, 86c', 86c". Similarly, it is desirable that the press fitting margin be less than 0.1 mm at the clamping location furthest from the free end 86c, 86c', 86c" and 0.1 mm or more closer thereto. The advantages with the embodiments shown in FIGS. 21-26 correspond to those associated with the embodiments in FIGS. 19 and 20, as described above. In all the embodiments shown in FIGS. 21-26, preferably the coil spring 12c, 12c', 12c" is squared/rectangular in cross section.

The coil springs 12b, 12b', 12c, 12c', 12" in FIGS. 19-26 may each be modified by providing an additional winding portion extending arcuately along its associated groove. The extension has a surface perpendicular to the coil axis 42. The additional widening portion has a configuration gradually decreasing in thickness towards the free ends 86b, 86c, 86c', 86c". In one form, a thin-walled portion on the spring may be formed by simply cutting the coil spring along a plane perpendicular to the coil axis 42.

The additional winding portion and one of the groove surface portions 94d, 96d can be brought into planar contact with each other. This arrangement prevents run-out of the coil axes of the coil springs 12b, 12b', 12c, 12c', 12c" with respect to the rotational axis 42 of the cooperating pulley and facilitates assembly. The additional winding portion may have a serpentine portion, as at 206, 206' in FIGS. 19 and 20, or widened portions 212, 212', 212", as shown in FIGS. 21-26. It is preferred that the additional winding portions extend over approximately ¾ of the circumference of the associated groove, to thereby effectively prevent run-out of the coil axis of the coil spring.

Additionally, it is desirable, but not required, that the width of each of the grooves 68d in FIGS. 19-25 be uniform to facilitate manufacture and thereby control manufacturing costs.

Figure 27:
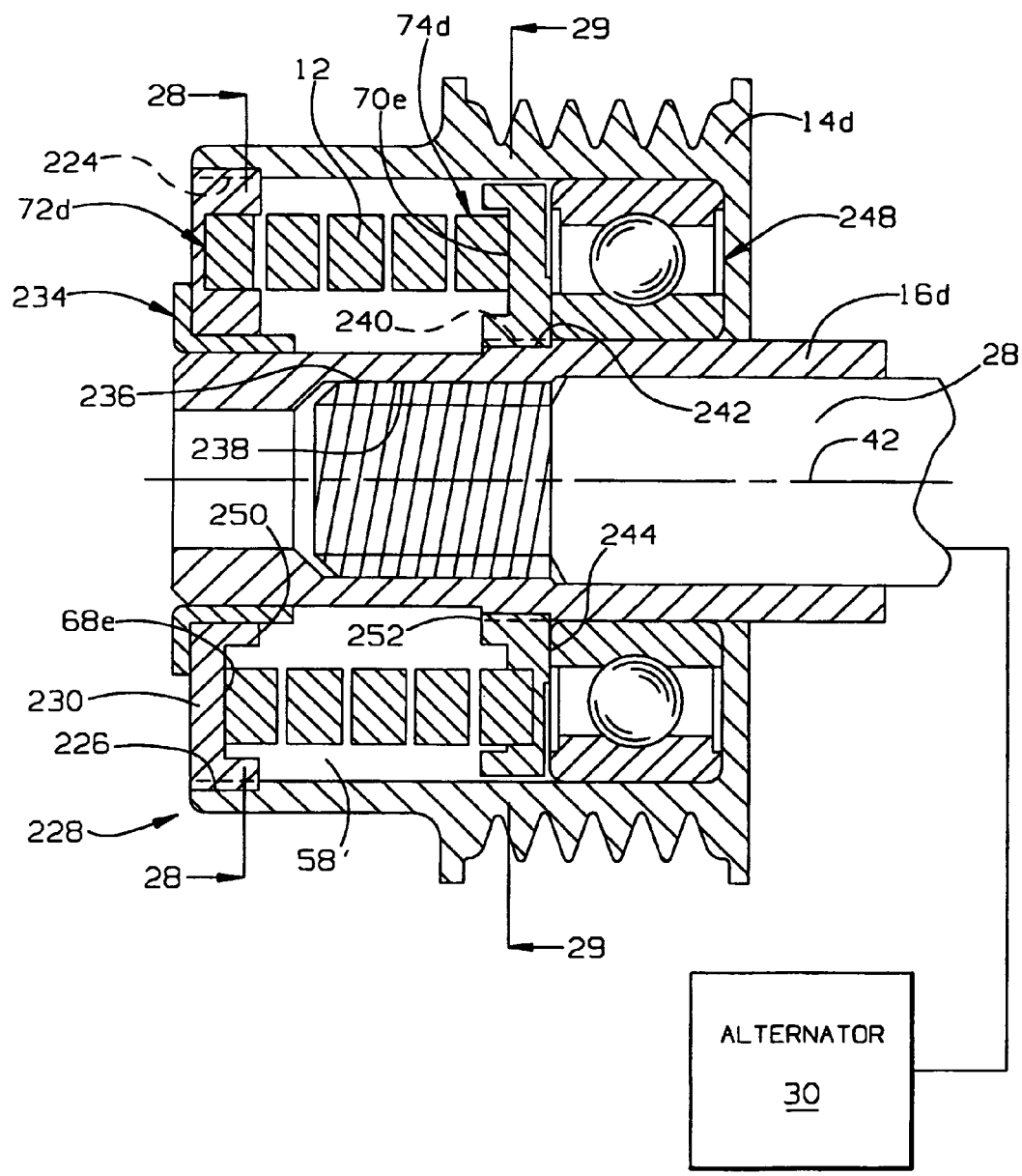
FIG. 27 is a cross-sectional view of a further modified form of pulley assembly wherein separate sidewall plates define grooves for the coil spring end portions.
Figure 28:
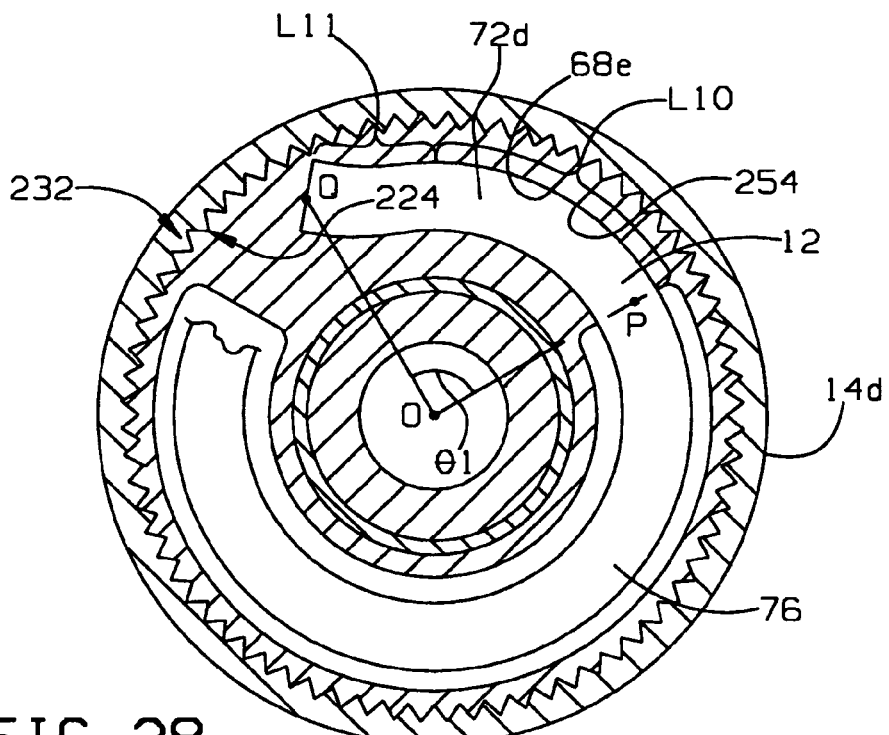
FIG. 28 is a cross-sectional view of the pulley assembly taken along line 28-28 of FIG. 27.
Figure 29:
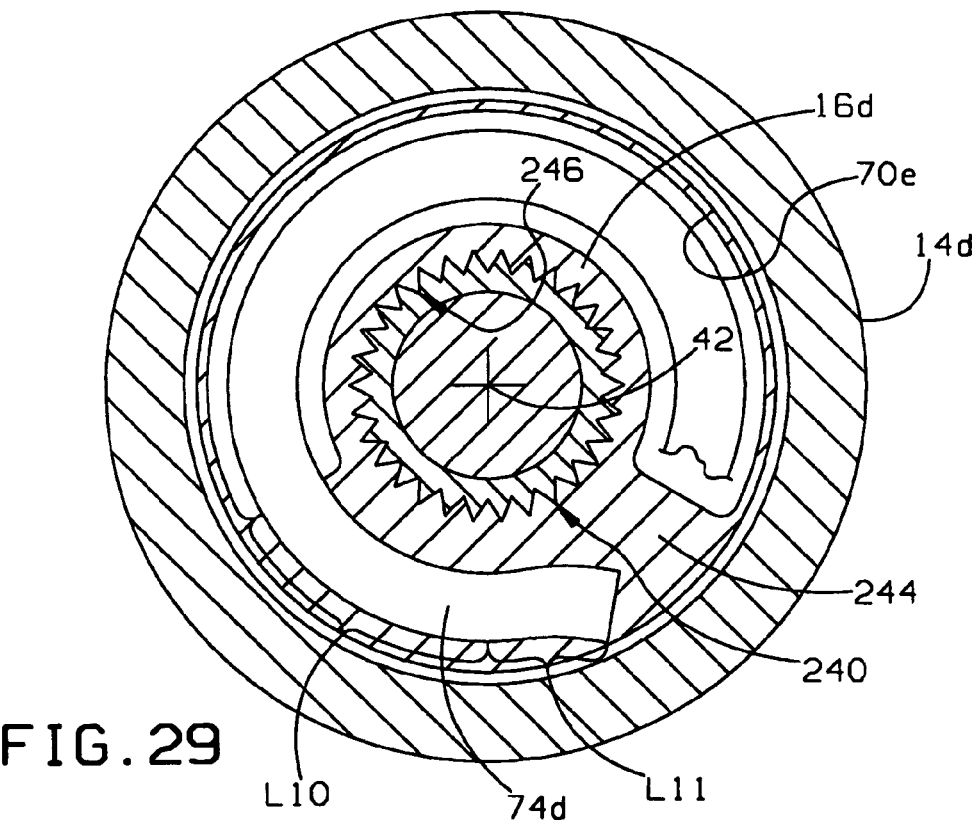
FIG. 29 is a cross-sectional view of the pulley assembly taken along line 29-29 of FIG. 27.

In FIGS. 27-29, another form of pulley assembly is shown consisting of a first member/pulley 14d and a second member 16d that are interconnected through the coil spring 12 so that rotational forces between the first member/pulley 14d and second member 16d are transmitted through the coil spring 12. Asperities 224 are formed on a radially inwardly facing peripheral surface 226 on the first member/pulley 14d, extending fully around the axis 42 at one axial end 228 on the first member/pulley 14d. The asperities 224 are formed at regular intervals and are in the form of knurling.

A sidewall plate 230 nests against the surface 226, that is radially undercut so as to define a receptacle for the sidewall plate 230. Asperities 232, having complementary configurations to the asperities 224, are formed on the sidewall plate 230 to mesh with the asperities 224. The asperities 224, 232 become mechanically engaged, whereby the sidewall plate 230 is fitted in and fixed relative to the first member/pulley 14d in a manner that the first member/pulley 14d and sidewall plate 230 rotate around the axis 42 unitarily as one piece.

A dry-metal-type bearing 234 is interposed between the sidewall plate 230 and the second member 16d, that is in the form of a cylindrical hub that is fitted to the shaft 28 on the alternator 30. The shaft 28 has external threads 236 that mate with internal threads 238 on the second member 16d.

Asperities 240 are formed on the radially outwardly facing surfaces 242 on the second member 16d and extend fully around the periphery thereof, as seen in FIG. 29. The asperities 240 are formed at equal circumferential intervals as by knurling.

A second sidewall plate 244 is fit around the outside of the second member 16d at a location spaced axially from the aforementioned end 228. Asperities 246 are formed on the sidewall plate 244 that are complementary to, and mesh with, the asperities 240 in such a manner that the asperities 240, 246 are mechanically interengaged. With this relationship, the sidewall plate 244 is fixed with respect to the second member 16d so that they rotate unitarily around the axis 42 and are not relatively movable with respect to each other around the axis 42. The sidewall plate 244 resides between a bearing 248 and the coil spring 12.

The sidewall plates 230, 244 may each be made from a resin material, such as polyacetal, polyarylate, polycarbonate, polyester, or polyamid. The sidewall plates 230, 244 need not, however, be made from a resin material.

With this construction, the chamber 58' for the spring 12 is defined cooperatively by the first member/pulley 14d, the second member 16d, and the sidewall plates 230, 244. The sidewall plates 230, 244 define the axial ends of the chamber 58'. Flat surfaces 250, 252 on the sidewall plates 230, 244 face each other and establish the axial dimension of the chamber 58'.

Through the surfaces 250 on the sidewall plate 230 and 252 on the sidewall plate 244, axially spaced grooves 68e, 70e are respectively formed. Spring end portions 72d, 74d are fixed in the grooves 68e, 70e, respectively.

The configuration of the groove 68e can be seen in FIG. 28. The groove 68e has a clamping portion defined by the combined circumferential lengths L10 and L11. The surface 254 bounding the groove 68e is in close contact with the coil spring 12 along the length L10. The coil spring 12 is arcuate over the length L10. The length L11 of the coil spring 12 extends in a gentle arc-like manner away from the rotational axis 42.

The radius of curvature for the coil spring 12 along the length L10 is substantially matched to the average radius of the individual coils 76 on the coil spring 12. The coil spring portion along the length L11 is curved oppositely to the direction of curvature for the coil spring portion along the length L10.

In this embodiment, the point P identifies the circumferential location at which the relationship between the groove surface 254 and coil spring 12 changes from intimate contact to a spaced relationship. The free end of the coil spring 12 is identified by the point Q. With the center point at 0, the angle defined between the distances between P and O and O and Q, identified by θ1 in FIG. 28, is on the order of 90°. With this relationship, the coil spring 12 is not prone to separating from the groove 68e. The angle θ1 is not limited to 90°. Preferably, the angle θ is not less than 60° and not more than 180° to produce the desired holding force.

As an alternative to the construction shown in FIG. 28, the length L11 of the coil spring, while shown reversely bent from the length L10, can be bent to curve in the same direction as for the length L10. With the same direction of curvature, it is preferred that the radii for the lengths L10 and L11 be different, making possible a satisfactory connection of the coil spring 12. It is also possible to configure the groove 68e so that it has a plurality of arcuate portions that curve in different directions to produce an S-shaped pattern around the circumference of the groove 68e.

As a further alternative, it is possible to form the length L10 in a straight shape, with the length L11 transitioning smoothly from the end of the length L10.

As a further alternative, the length L11, or a different length, may be sharply radially bent, either inwardly or outwardly, to effect the aforementioned locking action. The bend angle may be on the order of 90°.

In FIG. 29, the configuration of the opposite groove 70e is shown. The groove 70e has substantially the same configuration as the groove 68e. As noted previously, the connection of one of the end portions 72d, 74d of the coil spring 12 may be varied from the construction shown in FIGS. 28 and 29. That is, one of the end portions 72d, 74d may be connected by structure as described herein, or by other structure known to those skilled in the art.

Where the coil spring 12 is in intimate contact with its associated member 14d, 16d, the holding force of the coil spring 12 may be augmented by gluing the end portion 72d, 74d to its respective member, or by resin molding part of the member 14d, 16d integrally with the respective end portion 72d, 74d. By integrally and permanently molding this connection, it may be possible to achieve a significant reduction in assembly time, as well as the attendant production costs.

In those embodiments that use asperities, it is also possible to use glue between the coil spring and cooperating surface(s) to enhance the connection therebetween.

With the construction shown in FIGS. 27-29, the sidewall plates 230, 244 and the first member/pulley 14d, and second member 16d can be separately formed to facilitate the manufacturing process for this system. The cooperating asperities assure positive connection between the sidewall plates 230, 244 and their respective members 14d, 16d.

All the aforementioned advantages of a coil spring may be realized with this construction. The portions of the coil spring 12, other than those lengths that are clamp fit within the grooves 68e, 70e, may have coils with curvatures matched to the curvature of the grooves 68e, 70e, with the exception of those lengths coinciding with the lengths L10, L11 of the end portions 72d, 74d. By varying the curvature, particularly over the length L11, the coil spring 12 can be positively held in the grooves 68e, 70e. The lengths L10 may have a curvature corresponding to the average diameter of the coils for the spring 12, or a different diameter.

By controlling θ1 to be within the range of 60-180°, adequate securing of the end portions 72d, 74d is made possible. By making the sidewall plates 230, 244 from resin, processing is facilitated, which may allow reduction in manufacturing costs.

The asperities 224, 232, 240, 246 may be formed by knurling, which again facilitates manufacture. The asperities make possible a positive connection of the end portions 72d, 74d to their respective members 14d, 16d.

Figure 30:
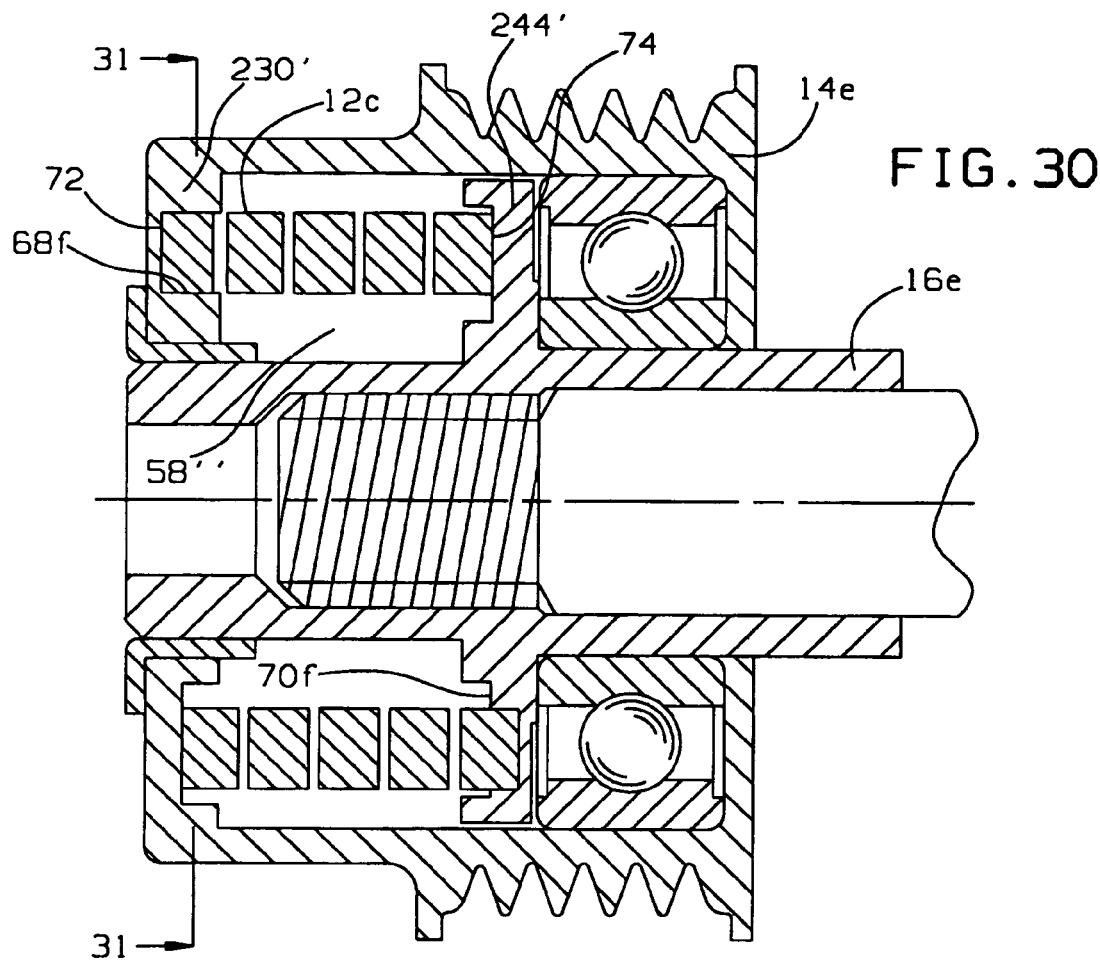
FIG. 30 is a view as in FIG. 27 of a modified form of pulley assembly wherein the first and second members have integral flanges defining grooves for the end portions of the coil spring.
Figure 31:
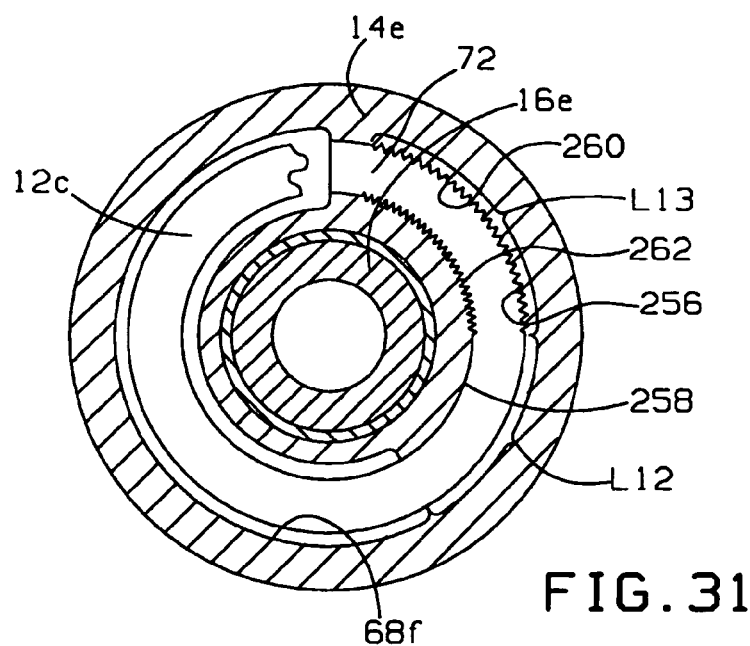
FIG. 31 is a cross-sectional view of the pulley assembly taken along line 31-31 of FIG. 30.

In FIGS. 30 and 31, a pulley system is shown with a configuration in many respects similar to that in FIGS. 27-29. Instead of employing separate sidewall plates, the corresponding sidewalls 230', 244' are defined by radially extending flanges that are respectively integral with the first member/pulley 14e and second member 16e. A spring chamber 58" is defined cooperatively by the first member/pulley 14e and second member 16e. The coil spring 12 is captive between the flanges 230', 244' to be maintained within the chamber 58".

The flange 230' has a groove 68f formed therein, with the flange 244' having a like groove 70f formed therein. The exemplary groove 68f, as shown in detail in FIG. 31, is arcuately shaped.

The coil spring 12 has a portion identified by the circumferential lengths L12 and L13 that is clamped within the groove 68f. Over this combined length L12 and L13, the coil spring 12c is in contact with oppositely facing groove surfaces 256, 258. On the groove surface 256, asperities 260 are formed, with additional asperities 262 formed on the groove surface 258. The asperities 260, 262 may be made by any known means. The asperities 260, 262 may be fine in nature and formed as by serration, knurling, or the like. This arrangement produces a positive locking length L13 for the end portion 72 of the coil spring 12. Over the length L12, there is intimate contact between the coil spring 12 and groove surfaces 256, 258 without the requirement for asperities. A stable connection between the coil spring 12 and groove surfaces 256, 258 can be established through these components.

The opposite end portion 74 of the coil spring 12 may be fixed within the groove 70f in the same manner that the end portion 72 is fixed in the groove 68f. It should be understood, as previously noted, that this type of connection can be used on only a single one of the end portions 72, 74, with the other end portion secured by any other means described herein or otherwise known to those skilled in the art.

It is not necessary that the asperities 260, 262 be provided on both groove surfaces 256, 258. Preferably, the asperities 260 are provided on at least the groove surface 256. As a result, the locking length of the coil spring 12 need not be specially processed to positively secure the coil spring 12 at its end portions 72, 74. This construction lends itself to manufacture at a relatively low cost. At the same time, the asperities 260, 262 assure a positive holding of the coil spring 12.

In this design, the length L12 is frictionally held in place, whereas the length L13 of the coil spring 12 is more positively secured/locked by reason of the asperities 260, 262. The connection is made possible by a simple press fit step whereby the end portions 72, 74 are directed axially into their respective grooves 68f, 70f.

While asperities are not shown and not required to be formed upon the coil spring 12c along the combined length L12, L13 thereof, to further enhance the holding force upon the spring 12c, asperities may be likewise provided on the coil spring 12c, particularly along the length L13. The asperities could be provided as an alternative to the asperities 260, 262, or together therewith, so that the asperities on the groove surfaces 256, 258 and spring 12c intermesh to effect more positive holding of the spring 12c. The asperities may be randomly formed or may be such that they are complementary in nature to mesh in a predetermined manner to positively resist circumferential shifting of the coil spring 12c.

Figure 32:
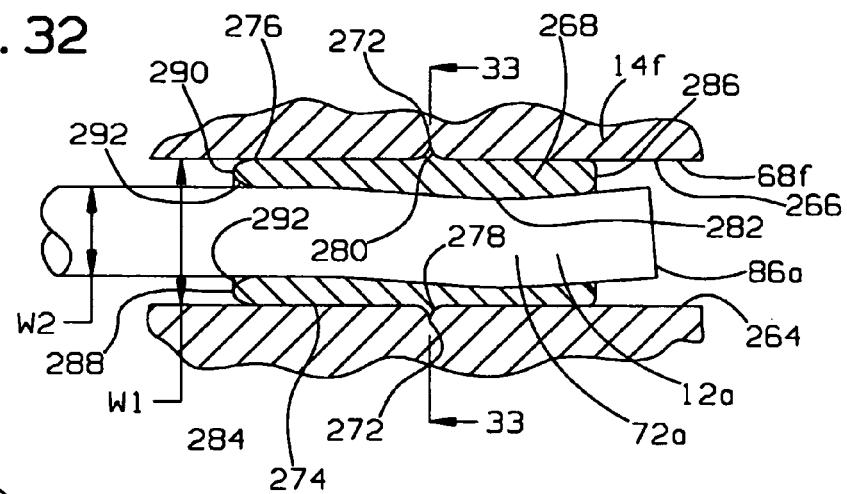
FIG. 32 is a view as in FIGS. 21, 23 and 25 wherein a separate collar is used to connect the coil spring end to its respective member.
Figure 33:
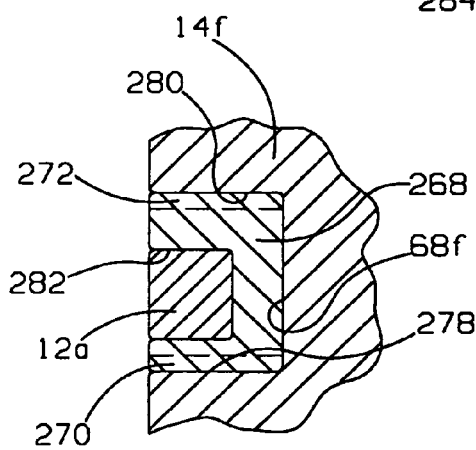
FIG. 33 is a cross-sectional view of the pulley assembly taken along line 33-33 of FIG. 32.

Another form of pulley assembly, according to the invention, is shown in FIGS. 32 and 33. The structure in FIGS. 32 and 33 is shown with respect to a representative first member/pulley 14f, to which an end portion 72a of a coil spring 12a is secured. While curved, the spring 12a and groove 68f are shown straight for purposes of simplicity. The opposite end portion of the coil spring 12a can be secured to the second member 16f in like fashion, or in a different manner.

In this embodiment, the groove 68f has a width W1 that is substantially greater than the width W2 of the coil spring 12a. To interconnect the end portion 12a and groove surfaces 264, 266, a collar 268 is utilized. The collar 268 has an U-shaped cross-sectional configuration, as shown in FIG. 3e. The collar 268 is secured within the groove 68f on the first member/pulley 14f that serves as a base.

Protrusions 270, 272 project from the oppositely facing collar surfaces 274, 276, respectively. Complementary recesses 278, 280 are formed respectively through the groove surface portions 264, 266 to receive the protrusions 270, 272. With the protrusions, 270, 272 fit within the recesses 278, 280, the collar 268 is firmly held within the groove 68f.

The collar 268 in turn defines a groove 282 into which the end portion 72a of the coil spring 12a is press fit. The groove 282 has a gently curved, arcuate configuration between axially spaced, open ends 284, 286. The end portion 72a of the coil spring 12a is press fit into the groove 282 with the free end 86a thereon protruding slightly from beyond the end 286.

A similar collar arrangement may be utilized to secure the opposite end portion of the coil spring 12a to its respective member. Alternatively, the other end portion can be connected by other means, either described herein or known to those skilled in the art.

Curved surfaces 288, 290 are formed at the collar end 284 and produce gaps 292 increasing in width in a direction away from the free end 86a. The curved surfaces 288, 290 may be arcuate in shape. This arrangement avoids fatigue that may lead to fracture due to stress concentration.

By reason of being able to separately form the collar 268, manufacture may be facilitated. This may translate into reduced manufacturing costs. At the same time, this arrangement produces a positive connection between the coil spring 12a and collar 268, and in turn between the collar 268 and first member/pulley 14f.

Further, a compact construction can be arrived at by reason of installing the collar 268 in the groove 68f. This aids in the compaction of the design of the overall system.

Figure 34:
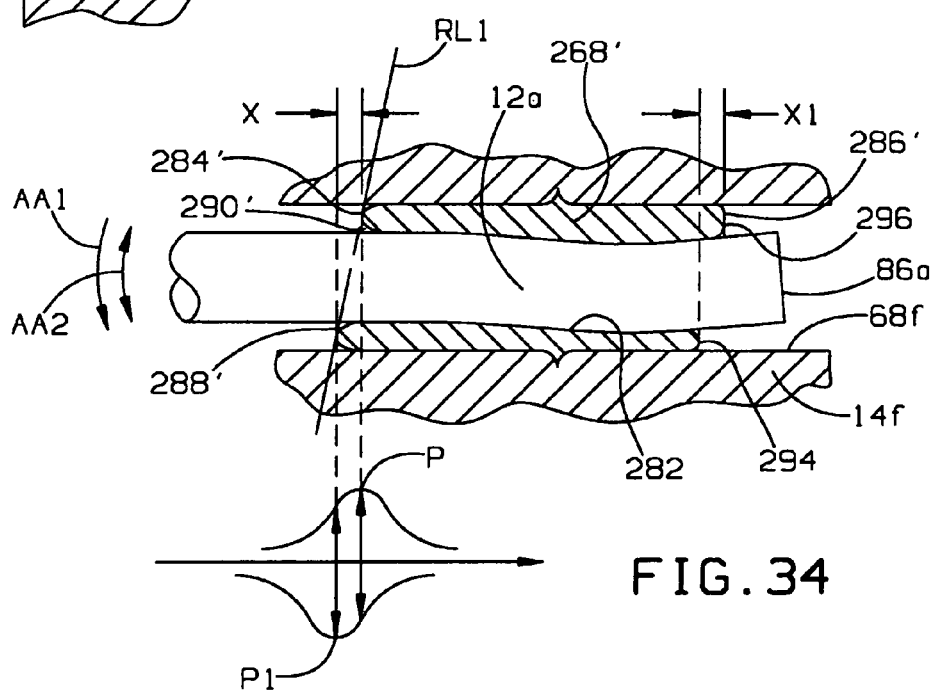
FIG. 34 is a view as in FIG. 32 wherein ends of the collar are modified to avoid detrimental stress concentrations.

In FIG. 34, a variation of the pulley in FIGS. 32 and 33 is depicted. In FIG. 34, the first member/pulley 14f has the aforementioned groove 68f. A collar 268' is secured within the groove 68f.

At the open end 284' of the collar 268', the end surfaces 288', 290' are modified from the corresponding surfaces on the collar 268. That is, the axial extent of the end surfaces 288', 290' is different, with the former extending circumferentially beyond the latter, away from the free end 86a of the coil spring 12a, by a distance X. This shape may be achieved, for example, by forming the end 284' at an incline, as along the reference line RL1.

As a result of this construction, it is possible to shift the peaks P, P1 of the stress amplitudes, resulting from right-hand and left-hand twisting, as shown by the graph in FIG. 34, wherein the amplitude is indicated along the Y axis. The right-hand twisting is indicated by the arrow AA2, with the left-hand twisting indicated by the arrow AA1. As a result, the stress amplitude at any one section can be reduced so as to potentially increase the life of the coil spring 12a.

A like arrangement can be provided at the opposite end 286' of the collar 268'. That is, curved end surfaces 294, 296 may be axially offset by a distance X1.

The spring 12a may cooperate within the groove 282' in the same manner that the coil spring 12a cooperates within the groove 282, as described with respect to FIGS. 32 and 33.

Figure 35:
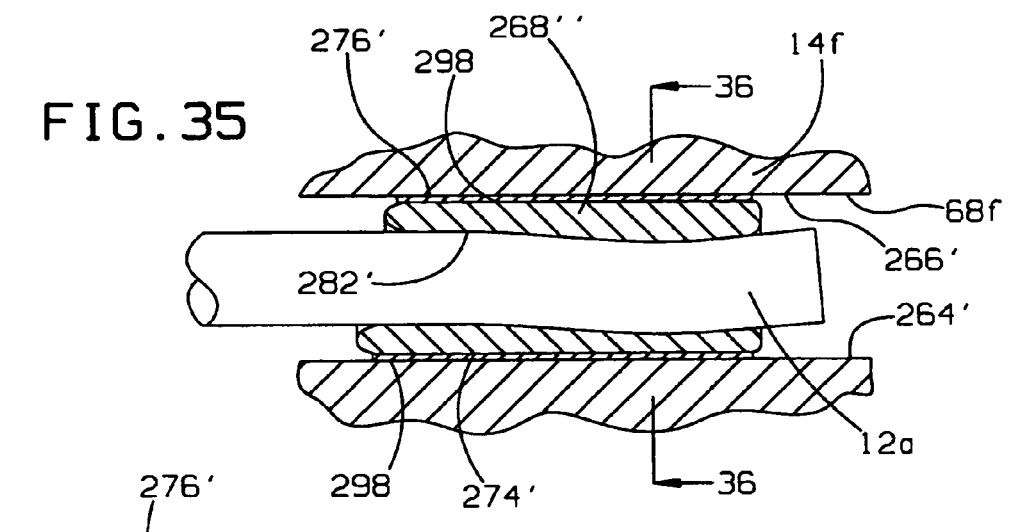
FIG. 35 is a view as in FIG. 34 wherein the collar is welded within a groove in its associated member.
Figure 36:
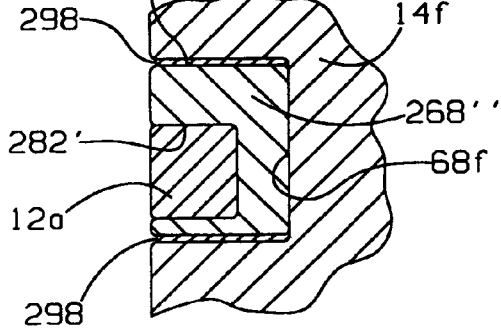
FIG. 36 is a cross-sectional view of the pulley assembly taken along line 36-36 of FIG. 35.

As an alternative to using the aforementioned recesses 278, 280 and protrusions 270, 272, or in addition thereto, a collar 268", as in FIGS. 35 and 36, may be secured within the groove 68f by welding, soldering, an adhesive, etc. More specifically, in a preferred form, a brazing material 298 is used between the collar surface 274' and the groove surface 264' and the collar surface 276' and the collar surface 266'. The collar 268" may otherwise cooperate with the groove 68f and coil spring 12a in the same manner as do the collars 268, 268'. Brazing material 298 may be, for example, silver solder. However, this should not be viewed as limiting.

Figure 37:
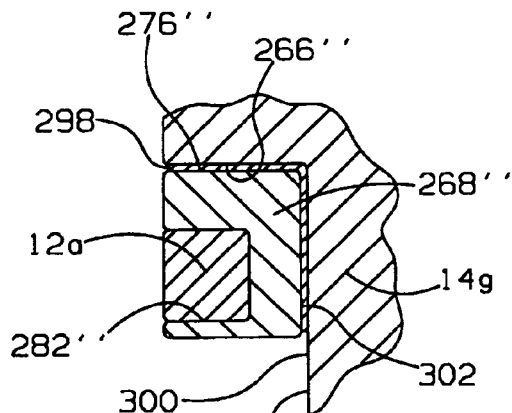
FIG. 37 is a view as in FIG. 36 wherein an L-shaped receptacle/groove is provided for the collar instead of the U-shaped groove in FIG. 36.

In FIG. 37, a modified form of member 14g is shown wherein, instead of a U-shaped groove 68f, an L-shaped receptacle/groove 300 is formed to receive the collar 268" and coil spring 12a within the groove 282" defined in the collar 268". With this construction, the brazing material 298 acts between the collar surface 276" and surface 266". Brazing material 298 also acts between the transverse collar surface 302 and axially facing receptacle/groove surface portion 304. Through this arrangement, the collar 268" can be securely fixed relative to the first member/pulley 14g.

Figure 38:
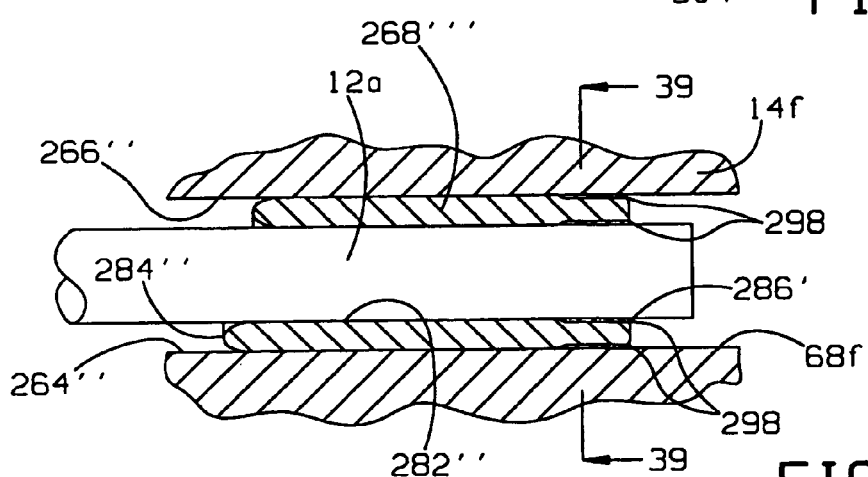
FIG. 38 is a view as in FIG. 25 wherein the collar is connected by brazing to both the coil spring and its respective member.

In FIGS. 38 and 39, a modified form of collar is shown at 268''' within the groove 68f on the first member/pulley 14f. In this embodiment, the groove 282" defined by the collar 268" has a straight configuration.

In this embodiment, brazing is effected between the collar 268''' and the groove surfaces 264", 266" and additionally between the collar 268''' and the coil spring 12a. While brazing is shown at the collar end 286', the brazing material 298 can be placed at this location, and/or at other locations, among which is at the opposite collar end 284".

It should be understood that the straight configuration for the coil spring 12a is not required. Virtually any other shape, as heretofore described, is also contemplated.

In FIG. 40, the collar 268''' is shown attached within the receptacle/groove 300 of the first member/pulley 14g, as shown in FIG. 37. Brazing material 298 is provided between the collar surface 302 and surface portion 304 and likewise between the collar surface 276" and the receptacle/groove surface 266'''. Brazing material 298 is additionally provided between the coil spring 12a and surface portions 306, 308 bounding the groove 282".

In a further variation shown in FIG. 41, spacers 310, 312 may be interposed between the coil spring 12a and groove surfaces $264^{4x'}$ and $266^{4x'}$ on the member 14h. The accommodating groove 68g has a lesser axial extent than is required with the use of a U-shaped collar. Brazing material 298 is provided between the coil spring 12a and each of the spacers 310, 312, as well as between the spacers 310, 312 and the surface portions $264^{4x'}$ and $266^{4x'}$, respectively.

Figure 42:
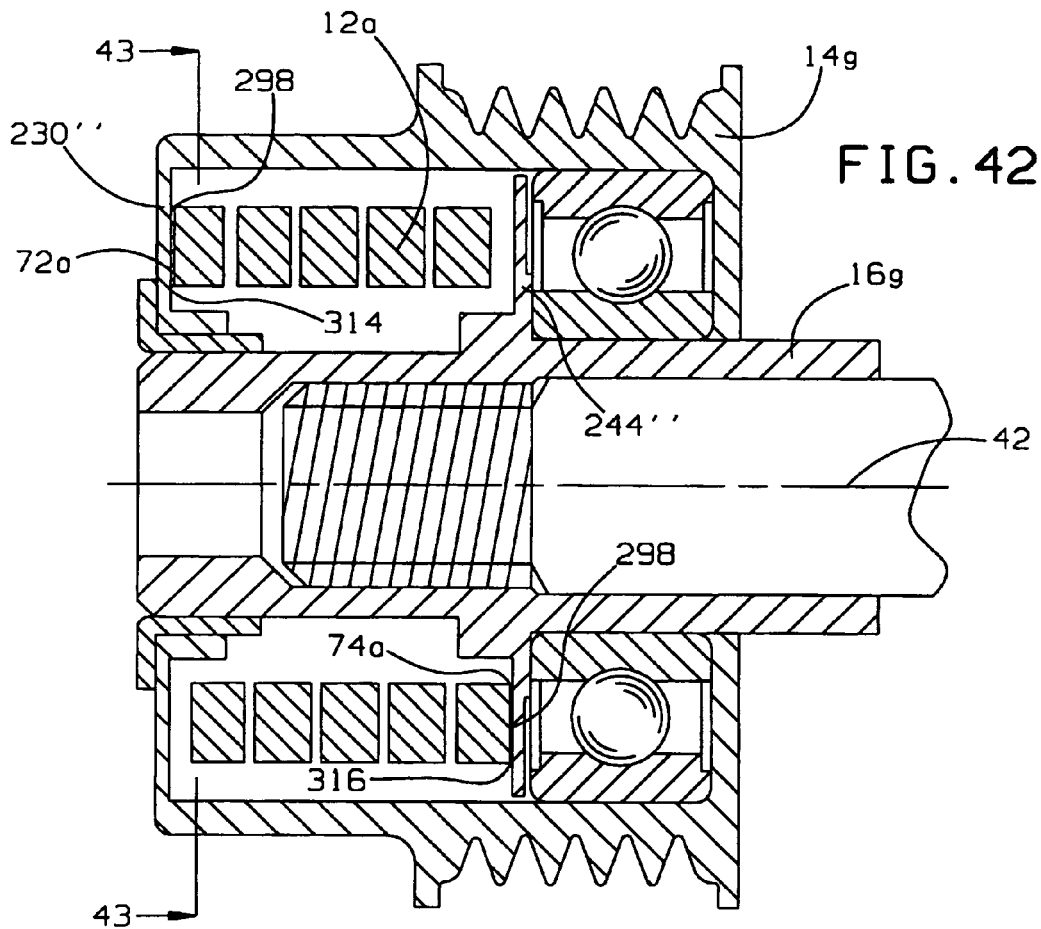
FIG. 42 is a cross-sectional view of a still further modified form of pulley assembly, wherein end portions of the coil spring are secured to their respective members through brazing.
Figure 43:
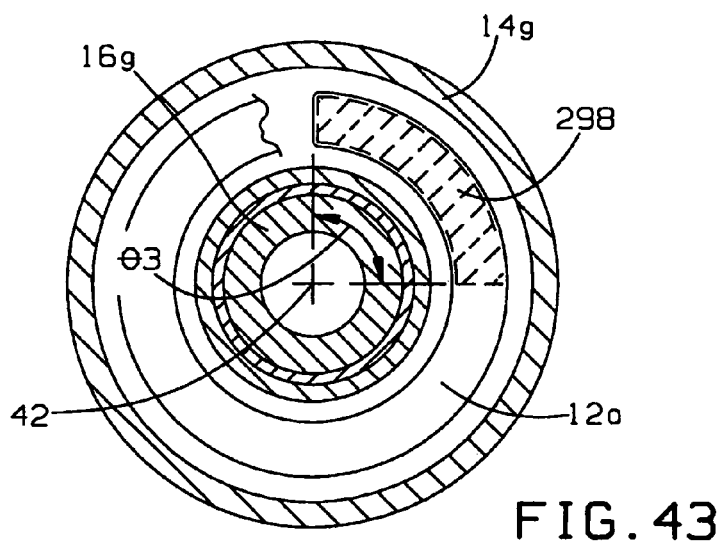
FIG. 43 is a cross-sectional view of the pulley assembly taken along line 43-43 of FIG. 42.

A further modified form of pulley system is shown in FIGS. 42 and 43. The pulley assembly in FIGS. 42 and 43 is similar in many respects to that shown in FIG. 30, to include a first member/pulley 14g and second member 16g which are relatively movable around the axis 42. The coil spring 12a has an end portion 72a that is attached, using brazing material 298, to an axially facing surface 314 on a flange 230" on the first member/pulley 14g. In like fashion, the end portion 74a of the coil spring 12a is attached to an axially facing surface 316 on a flange 244" on the second member 16g using brazing material 298.

The brazing material 298 at each end portion 72a, 74a extends through an angle θ3 of approximately 90° around the axis 42. However, this is not a requirement as the extent of the brazing may be changed on a case-by-case basis, as a particular application dictates.

Figure 44:
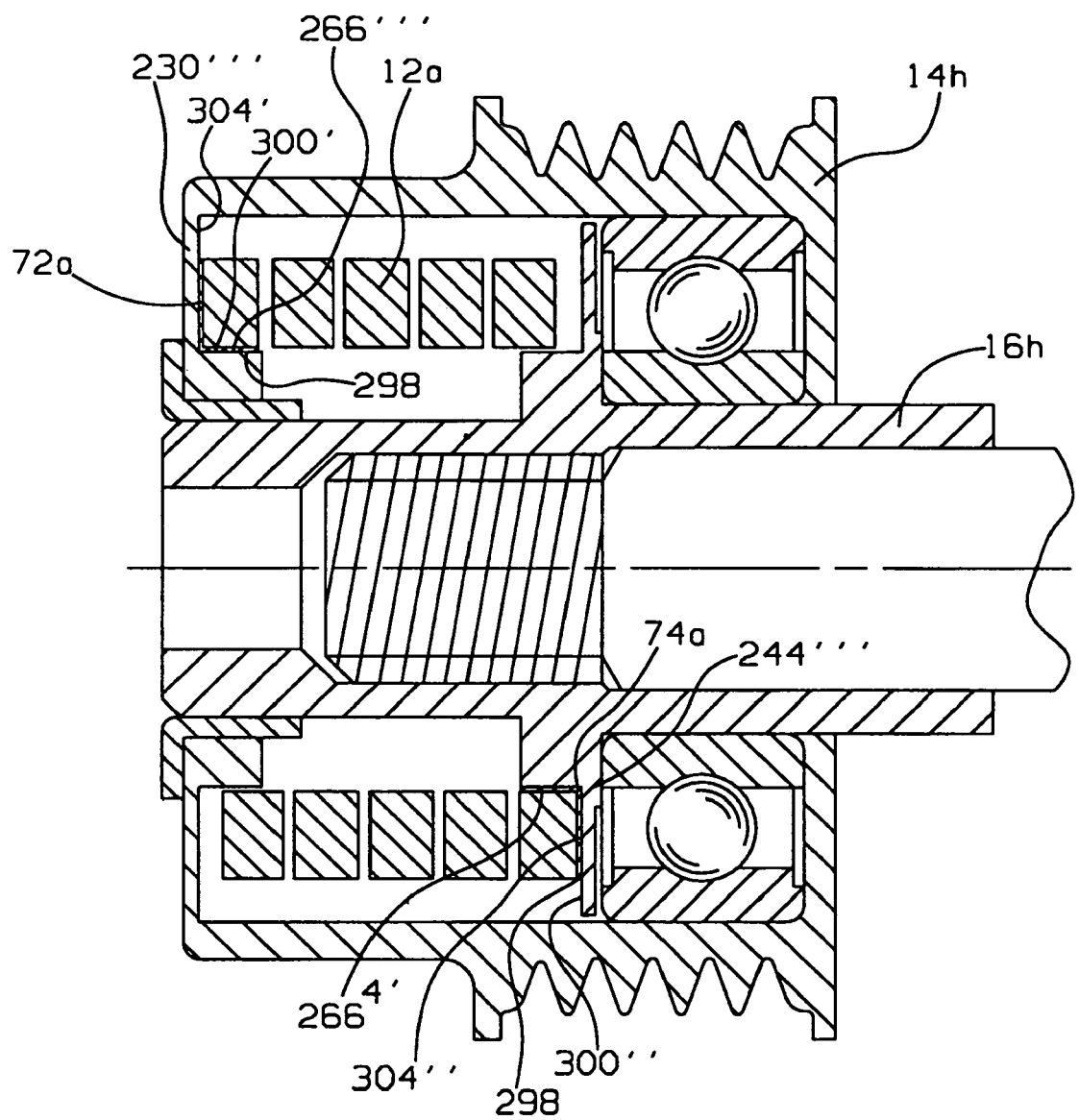
FIG. 44 is a view as in FIG. 42 of a still further modified form of pulley assembly wherein the end portions of the coil spring are in a receptacle and brazed at transverse surfaces.

Whereas in the pulley assembly shown in FIGS. 42 and 43, the brazing material 298 is at only cooperating axially facing surfaces on the coil spring 12a and members 14g, 16g, as shown in the pulley assembly in FIG. 44, other soldering arrangements are contemplated. In FIG. 44, the first member/pulley 14h has a flange 230''' defining an L-shaped receptacle/groove 300' for the end portion 72a of the coil spring 12a. Soldering material 298 is applied between the coil spring 12a and transverse surfaces 266''' and 304'.

A like flange 244''' on the second member 16h defines an L-shaped receptacle/groove 300" into which the end portion 74a of the coil spring 12a seats. Soldering material 298 is likewise interposed between the coil spring 12a and transverse surfaces $266^{4x'}$ and 304".

Figure 45:
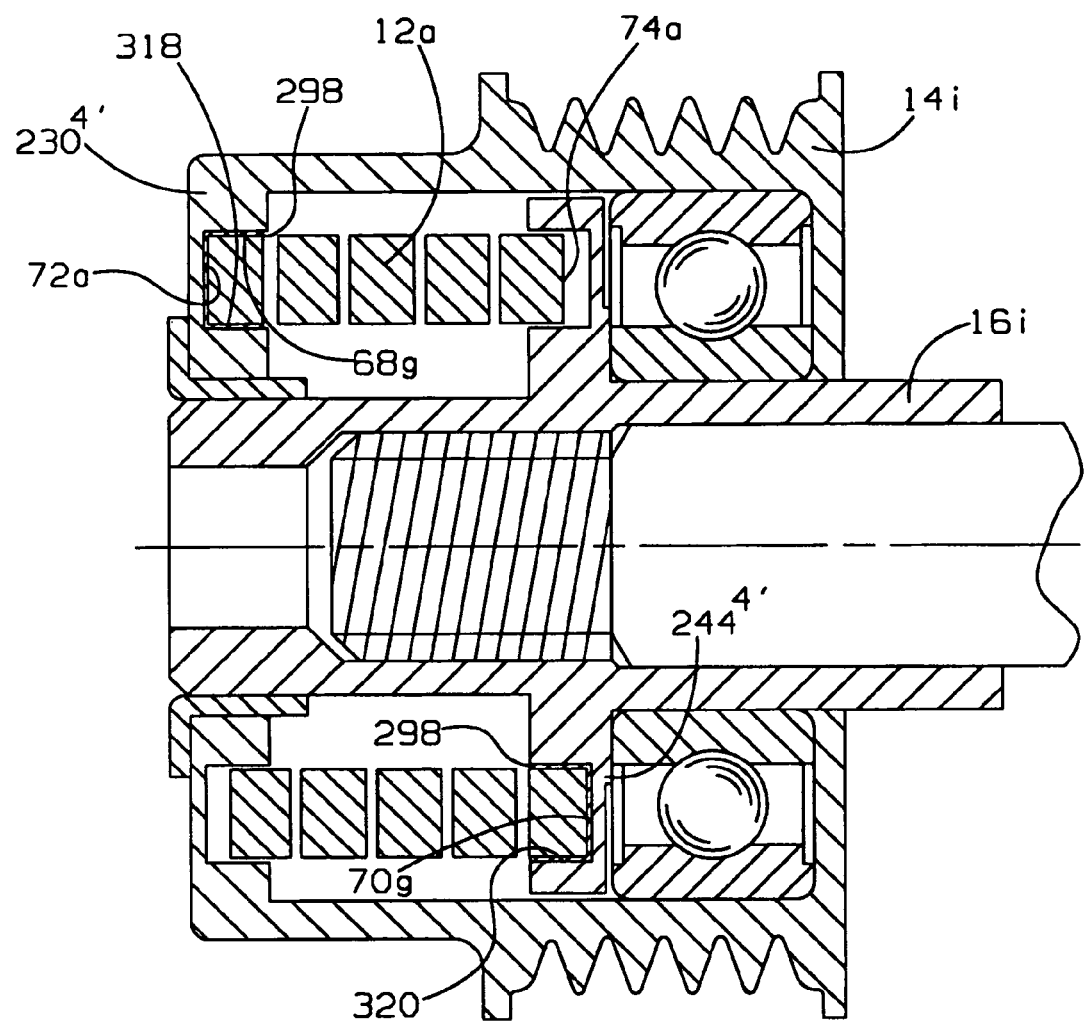
FIG. 45 is a view as in FIG. 44 of a still modified form of pulley assembly wherein connections between spring end portions and cooperating grooves are brazed.

In FIG. 45, a further modified form of system/pulley assembly is shown with a first member/pulley 14i and second member 16i, corresponding generally to the members 14h, 16h in FIG. 44. Instead of forming L-shaped receptacles/grooves as shown at 300', 300" in FIG. 44, the corresponding flanges $230^{4x'}$ and $244^{4x'}$ define U-shaped grooves 68g and 70g, respectively, to receive the end portions 72a, 74a of the coil spring 12a. Brazing material 298 is formed between the coil spring 12a over the entire area of the surfaces 318, 320, respectively bounding the grooves 68g, 70g.

This construction is relatively simple yet provides a positive connection between the end portions 72a, 74a of the coil spring 12a and the member 14i, 16i, respectively.

Figure 46:
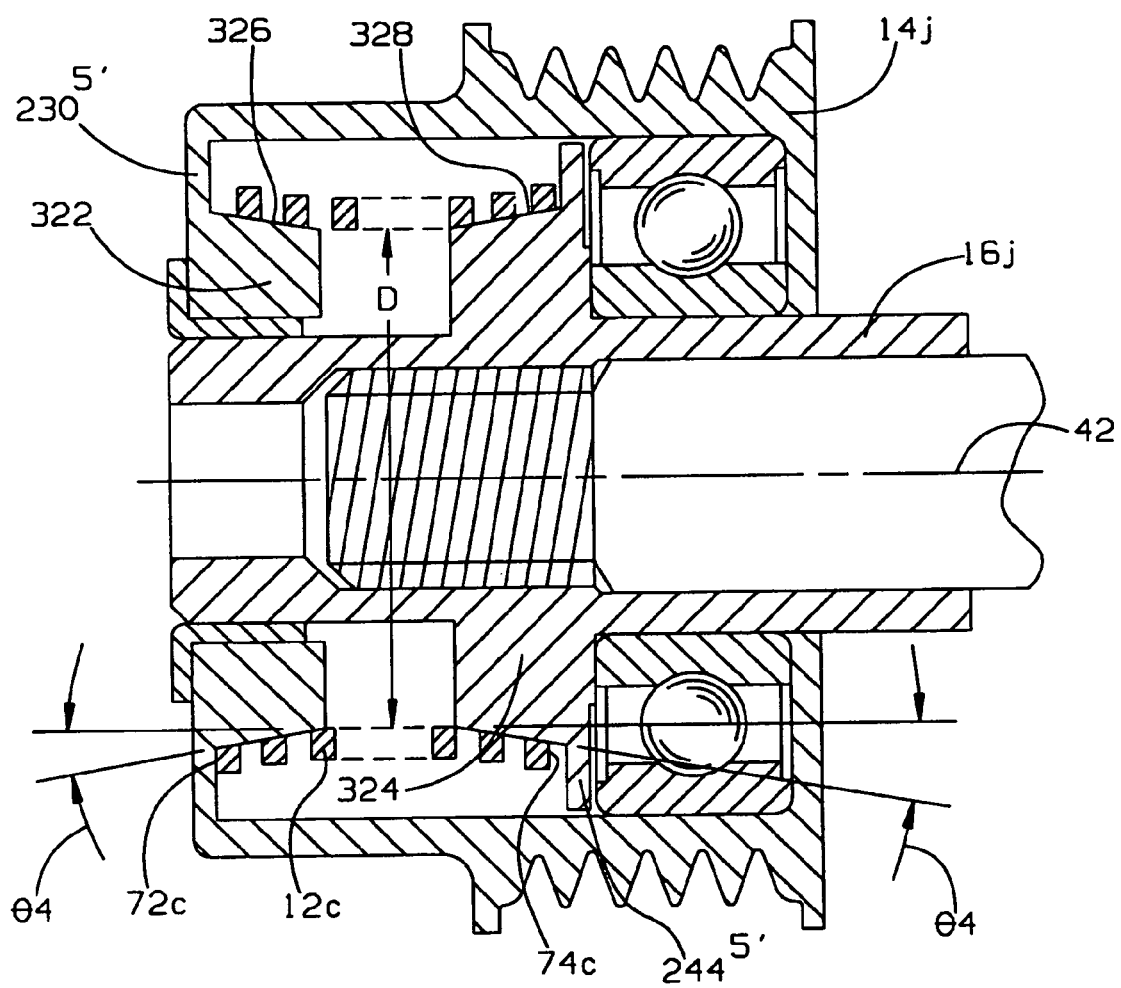
FIG. 46 is a view as in FIG. 45 of a still further modified form of pulley assembly wherein a coil spring surrounds and frictionally engages tapered retaining surfaces on cooperating members.

Another form of assembly is shown in FIG. 46, to include a first member/pulley 14j and second member 16j. The first member/pulley 14j has a flange $230^{5x'}$ with an integrally formed and axially extending retaining portion 322. Th flange $244^{5x'}$ has a like, axially extending retaining portion 324. The retaining portions 322, 324 extend axially towards each other from their respective flanges $230^{5x'}$ and $244^{5x'}$.

The retaining portion 322 has a retaining surface 326 facing radially outwardly with respect to the axis 42. The retaining portion 324 has a like retaining surface 328.

The retaining surfaces 326, 328 taper with respect to the axis 42, each at an angle θ4 in the range of 3-15°. Each of the retaining portions 322, 324 thus has a truncated conical shape, with the retaining surface 326 tapering from left to right and the retaining surface 328 tapering from right to left.

A coil spring 12c has axially spaced end portions 72c, 74c. The end portion 72c wraps around the retaining surface 326, whereas the end portion 74c wraps around the retaining surface 328.

The spring 12c is constructed so that in a relaxed state, an inside diameter D is smaller than the diameter of the retaining surfaces 326, 328. Thus, when the coil spring 12c is radially enlarged to surround the retaining surfaces 326, 328, a radial restoring force is produced in the end portions 72c, 74c, whereby the end portions 72c, 74c positively embrace the retaining surfaces 326, 328. The restoring force is sufficient that the coil spring 12c will not circumferentially shift relative to the retaining surfaces 326, 328.

While the retaining surfaces 326, 328 are shown to be tapered over their entire axially extent, the tapering may be provided along only a portion of the axial extent thereof. The remaining portion may be cylindrically shaped or shaped otherwise, as appropriate. It is preferred that the retaining surfaces 326, 328 be tapered at least where they contact the coil spring end portions 72c, 74c.

This particular design facilitates construction in that a simple press fit step is required to be carried out to assemble the coil spring 12c.

With the tapering angle of 3-15°, it is possible to positively fix the end portions 72c, 74c in position in a relatively simple manufacturing process.

Figure 47:
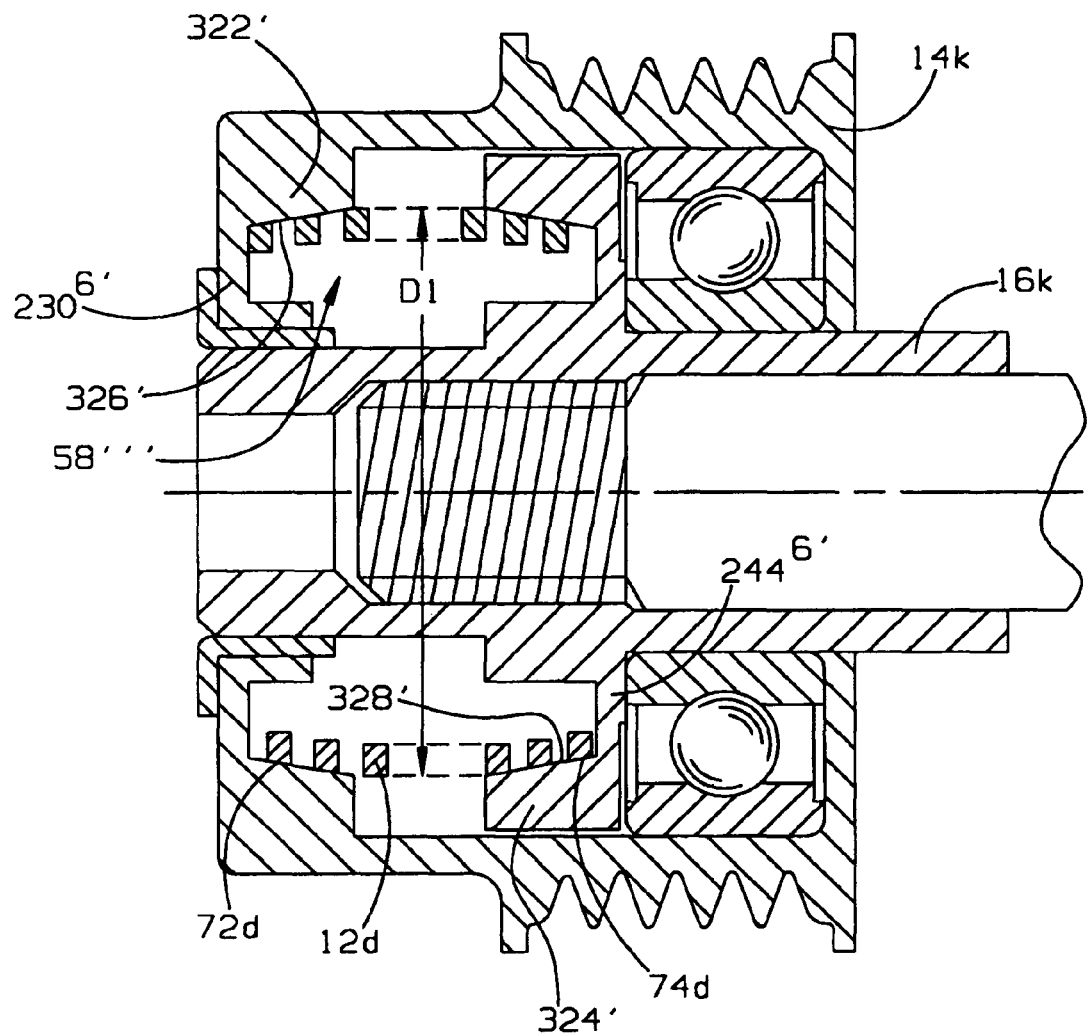
FIG. 47 is a view as in FIG. 46 of a further modified form of a pulley assembly wherein a coil spring acts radially outwardly against tapered retaining surfaces on cooperating first and second members.

In FIG. 47, a further modified form of pulley assembly is shown to include a first member/pulley 14k and a second member 16k. This assembly differs from that shown in FIG. 46 with respect to the configuration of flanges $236^{6x'}$ and $244^{6x'}$, respectively on the first and second members 14k, 16k.

The flange $230^{6x'}$ has an integral, axially extending retaining portion 322', with the flange $244^{6x'}$ having an integral, axially extending retaining portion 324'.

The retaining portion 322' has a radially inwardly facing retaining surface 326', with the retaining portion of 324' having a radially inwardly facing retaining surface 328'. The retaining surfaces 326', 328' cause the retaining portions 322', 324' to each have a truncated conical shape. The retaining surfaces 326', 328' converge axially towards each other.

A coil spring 12d is placed within a spring chamber 58''' defined cooperatively by the members 14k, 16k. The coil spring 12d, in a relaxed state, has an outside diameter D1 that is greater than the diameter of either of the retaining surfaces 326', 328'. As a result, the coil spring 12*d* must be radially compressed and thereby elastically deformed to be placed in the spring chamber 58''' so that the end portion 72*d* bears radially outwardly against the retaining surface 326' and the end portion 74*d* bears radially outwardly against the retaining surface 328'. By being elastically radially deformed, the end portions 72*d*, 74 have restoring forces therein that urge them radially outwardly forcibly into contact with the retaining surfaces 326', 328'. The components may be relatively dimensioned to produce a desired holding force between the coil spring 12*c* and members 14*j*, 16*j* to prevent circumferential movement of the coil spring 12*c* relative thereto.

With this arrangement, the assembly of the coil spring 12*c* can be carried out relatively simply by a press fitting step.

As in the embodiment shown in FIG. 45, it is not required that the retaining surfaces 326', 328' be tapered over their entire axial extent. Cylindrical, or other shapes may be utilized. However, it is preferred that at least those portions of the retaining surfaces 326', 328' that engage the coil spring 12*c* be tapered.

The various embodiments described above are exemplary in nature only. Many variations from the basic structures disclosed herein are contemplated.

As one example, one or more protrusions 324 may be provided on the structure shown in FIG. 12 to block circumferential movement of the coil spring 12*a* therein. The protrusion 324 may be radially inwardly or outwardly directed to abut the free coil spring end 86*a* to confine circumferential movement thereof.

As another variation, the locking structure shown in FIG. 6 may be combined with any of the alternative locking structures, such as those shown in FIGS. 9-13.

As a further variation, the blocking structure shown in FIGS. 9-13 may be used in a manner whereby the structure as shown along the connecting lengths, as at L10 and FIG. 27, might be omitted.

Further, any two of the coil spring end portion connections described herein could be used together for a single coil spring. It is not required that the end portions be connected in the same manner.

Further, instead of using brazing, welding or adhesives can be used for the same purpose.

The foregoing disclosure of specific embodiments is intended to be illustrative of the broad concepts comprehended by the invention.

The invention claimed is:

1. A pulley assembly comprising:
a first member capable of cooperating with a power transmission belt to drive/be driven by the cooperating power transmission belt;
a second member,
the first member movable guidingly relative to the second member around a first axis; and
a coil spring having a length and a circumference and a first portion with an arcuate length extending around the first axis and attached to the first member and a second portion with an arcuate length extending around the first axis and attached to the second member so that a force tending to move the first/second member around the first axis is transmitted through the coil spring to the second/first member,
each of the first and second portions defined by a formed, elongate member comprising turns each with a diameter and extending through no more than 360° around the first axis,
at least one of the first and second members having a groove that: a) opens axially and has an axial extent; and b) is bounded by a surface into which a respective portion of the coil spring is fit,
the respective portion of the coil spring having a curvature around the first axis with the coil spring in a relaxed state that is not matched to the surface bounding the groove,
the respective portion of the coil spring within the groove radially elastically deformed from the curvature the respective portion of the coil spring has with the coil spring in the relaxed state so that residual forces in the coil spring cause generation of radial forces acting between the surface bounding the groove and the respective portion that cause the respective portion of the coil spring to be clamped within the groove to thereby cause the respective portion of the coil spring to follow movement of the at least one of the first and second members around the first axis to thereby transmit forces between the first and second members through the coil spring,
the groove in the at least one of the first and second members has clamped therein only a single one of the turns on the first and second portions that cooperate with the at least one of the first and second members.

2. The pulley assembly according to claim 1 wherein the groove is arcuate with a curvature extending around the first axis.

3. The pulley assembly according to claim 2 wherein the respective portion of the coil spring and groove are relatively dimensioned so that there is a radial gap between the respective portion of the turn on the coil spring and groove surface that increases gradually from zero in a direction from the respective portion of the coil spring towards the other portion of the coil spring.

4. The pulley assembly according to claim 3 wherein the respective portion of the coil spring has a substantially constant diameter curvature around the first axis extending at the constant diameter curvature to a free end.

5. The pulley assembly according to claim 4 wherein a length of the respective portion of the coil spring spaced from the free end is clamp fit within the groove without any radial gap between the respective portion of the coil spring and groove surface.

6. The pulley assembly according to claim 3 wherein the respective portion of the coil spring and groove surface are in contact with each other at a first circumferential location and the radial gap increases from zero to 0.02 to 0.1 mm at a second circumferential location that is spaced circumferentially from the first location on the order of 5° towards the other portion of the coil spring.

7. The pulley assembly according to claim 1 wherein the groove surface has radially facing portions, the respective portion of the coil spring has a free end and a length of the respective portion of the coil spring spaced from the free end is clamp fit within the groove without any radial gap between the respective portion of the coil spring and either of the radially facing portions of the groove surface.

8. The pulley assembly according to claim 1 wherein the groove is curved around the first axis and the respective portion of the coil spring is curved around the first axis and the groove and respective portion of the coil spring have different curvatures from each other where the respective portion of the coil spring is clamp fit within the groove.

9. The pulley assembly according to claim 1 wherein the respective portion of the coil spring is clamp fit within the groove as an incident of press fitting the respective portion of the coil spring into the groove in an axial direction without requiring any additional components to maintain the coil spring clamp fit in the groove.

10. The pulley assembly according to claim 1 wherein the first and second members bound a chamber within which the coil spring resides.

11. The pulley assembly according to claim 1 wherein the groove surface is on a thin-walled portion of the one of the first and second members that flexes in a radial direction under a force applied by the coil spring.

12. The pulley assembly according to claim 1 wherein the respective portion of the coil spring terminates at a free end that is press fit axially to within the groove.

13. The pulley assembly according to claim 1 wherein the groove and at least one of the first and second members has a constant radial width over a circumferential clamp length.

14. The pulley assembly according to claim 1 wherein the groove has a constant radial width where the respective portion of the coil spring is clamp fit within the groove.

15. The pulley assembly according to claim 1 wherein the coil turns each has a first radius, the groove surface, where the respective portion of the coil spring is clamp fit, has a first arcuate portion with a second radius with the coil spring in a relaxed state, and the groove surface has a second arcuate portion, the second arcuate portion having a curvature that is opposite to a curvature for the first arcuate portion where the respective portion of the coil spring is clamp fit within the groove.

16. The pulley assembly according to claim 15 wherein the second radius is approximately equal to an average of the first radii for the coiled spring coils.

17. The pulley assembly according to claim 1 wherein the respective portion of the coil spring is clamp fit within the groove over a circumferential length and the circumferential length extends from between 60° and 180° around the first axis.

18. The pulley assembly according to claim 1 wherein the respective portion of the coil spring has a free end that faces circumferentially and does not engage the first member.

19. The pulley assembly according to claim 1 wherein the respective portion of the coil spring has a free end and a length of the respective portion of the coil spring spaced from the free end is clamp fit within the groove and a portion of the coil spring within the groove is not clamp fit within the groove.

20. The pulley assembly according to claim 1 wherein the groove is arcuate and extends around the first axis over a first length and has a substantially uniform axial extent over the first length.

21. The pulley assembly according to claim 1 wherein the respective portion of the coil spring remains at all times clamped in a fixed position within the groove.

22. The pulley assembly according to claim 1 wherein the groove in the at least one of the first and second members is selected so that the groove in the at least one of the first and second members is capable of having clamped therein only a single one of the coils of the first and second portions.

23. The pulley assembly according to claim 1 wherein each of the first and second members has a groove, the grooves on the first and second members opening axially oppositely, the coil spring having first and second axially spaced end turns that respectively define the first and second coil spring portions and the first and second coil spring portions are clamped in the grooves within the respective first and second members.

24. The pulley assembly according to claim 1 wherein the at least one of the first and second members and respective portion of the coil spring are maintained against relative movement around the first axis solely by radial forces acting between the surface bounding the groove on the respective portion of the coil spring within the groove.

25. The pulley assembly according to claim 24 wherein each of the first and second members and respective portions of the coil spring are each maintained against relative movement around the first axis solely by radial forces acting between surfaces bounding the grooves and the respective portions of the coil spring within the grooves.

26. The pulley assembly according to claim 1 wherein the radial forces are generated by movement of the respective portions of the coil spring radially inwardly.

27. The pulley assembly according to claim 1 wherein the single one of the turns in the groove in the at least one of the first and second portions substantially fixes at all times the single one of the turns in the groove in the at least one of the first and second portions against relative movement around the first axis.

28. The pulley assembly according to claim 27 wherein the respective portions of the coil spring are each fixedly locked through the radial forces within the respective grooves against relative movement around the first axis.

29. A pulley assembly comprising:
a first member capable of cooperating with a power transmission belt to drive/be driven by the cooperating power transmission belt;
a second member;
the first member movable guidingly relative to the second member around a first axis; and
a coil spring having a length and a circumference and a first portion with an arcuate length extending around the first axis and attached to the first member and a second portion with an arcuate length extending around the first axis and attached to the second member so that a force tending to move the first/second member around the first axis is transmitted through the coil spring to the second/first member,
each of the first and second members having a groove that: a) opens axially and has an axial extent; and b) is bounded by a surface into which a respective portion of the coil spring is fit,
the grooves opening axially oppositely toward each other,
the respective portion of the coil spring having a curvature around the first axis with the coil spring in a relaxed state that is not matched to the surface bounding the groove,
the respective portion of the coil spring within each groove radially elastically deformed from the curvature the respective portion of the coil spring has with the coil spring in the relaxed state so that residual forces in the coil spring cause generation of radial forces acting between the surfaces bounding the grooves and the respective portions that fixedly clamp the respective portions of the coil spring within the grooves to thereby cause the respective portions of the coil spring to at all times follow movement of the at least one of the first and second members around the first axis without any substantial slippage to thereby transmit forces between the first and second members through the coil spring.

* * * * *